(12) United States Patent
Beale et al.

(10) Patent No.: US 12,445,239 B2
(45) Date of Patent: Oct. 14, 2025

(54) COMMUNICATIONS DEVICE, INFRASTRUCTURE EQUIPMENT, AND METHOD FOR DETERMINING A USE OF FIRST PHYSICAL RESOURCES AND SECOND PHYSICAL RESOURCES BASED ON A FIRST FORMAT INDICATOR AND A SECOND FORMAT INDICATOR

(71) Applicant: Sony Group Corporation, Tokyo (JP)

(72) Inventors: Martin Warwick Beale, Basingstoke (GB); Kazuyuki Shimezawa, Basingstoke (GB); Shin Horng Wong, Basingstoke (GB)

(73) Assignee: SONY GROUP CORPORATION, Tokyo (JP)

( * ) Notice: Subject to any disclaimer, the term of this patent is extended or adjusted under 35 U.S.C. 154(b) by 598 days.

(21) Appl. No.: 17/795,552

(22) PCT Filed: Feb. 17, 2021

(86) PCT No.: PCT/EP2021/053897
§ 371 (c)(1),
(2) Date: Jul. 27, 2022

(87) PCT Pub. No.: WO2021/165326
PCT Pub. Date: Aug. 26, 2021

(65) Prior Publication Data
US 2023/0142814 A1    May 11, 2023

(30) Foreign Application Priority Data
Feb. 18, 2020 (EP) ..................... 20158107

(51) Int. Cl.
*H04L 12/28* (2006.01)
*H04L 5/00* (2006.01)
*H04L 5/16* (2006.01)

(52) U.S. Cl.
CPC .......... *H04L 5/0042* (2013.01); *H04L 5/0007* (2013.01); *H04L 5/0092* (2013.01); *H04L 5/16* (2013.01)

(58) Field of Classification Search
CPC ........ H04L 5/16; H04L 5/0092; H04L 5/0007
See application file for complete search history.

(56) References Cited

U.S. PATENT DOCUMENTS

2013/0083704 A1    4/2013   Gaal et al.
2013/0301486 A1   11/2013   Kishiyama
(Continued)

FOREIGN PATENT DOCUMENTS

WO    2020/112556 A1    6/2020

OTHER PUBLICATIONS

International Search Report and Written Opinion mailed on Apr. 8, 2021, received for PCT Application PCT/EP2021/053897, filed on Feb. 17, 2021, 12 pages.
(Continued)

*Primary Examiner* — Elisabeth Benoit Magloire
(74) *Attorney, Agent, or Firm* — XSENSUS LLP

(57) ABSTRACT

A communications device operating according to a Half Duplex Frequency Division Duplex mode of operation (HD-FDD) is configured to transmit and/or receive data in a wireless communications network. The communications device is configured to receive from the wireless communications network a first allocation of first physical resources of an uplink channel of a wireless access interface provided by the wireless communications network for transmitting uplink data to the wireless communications network, and to receive from the wireless communications network a second indicator of second physical resources of a downlink channel of the wireless access interface for receiving downlink data from the wireless communications network.

20 Claims, 13 Drawing Sheets

(56) References Cited

U.S. PATENT DOCUMENTS

| | | |
|---|---|---|
| 2015/0215956 A1 | 7/2015 | Georgeaux et al. |
| 2019/0053227 A1* | 2/2019 | Huang .................. H04L 5/0094 |
| 2019/0098612 A1* | 3/2019 | Babaei .............. H04W 72/0446 |
| 2019/0254024 A1* | 8/2019 | Nam ................... H04L 27/2607 |
| 2020/0259601 A1* | 8/2020 | Zhou .................... H04L 5/0085 |
| 2020/0267764 A1* | 8/2020 | Rastegardoost .. H04W 72/0446 |
| 2022/0007356 A1* | 1/2022 | Lee ......................... H04L 27/26 |

OTHER PUBLICATIONS

Ericsson, "New SID on support of reduced capability NR devices", 3GPP TSG RAN Meeting #86, RP-193238, Dec. 9-12, 2019, 5 pages.

3GPP, "Study on Scenarios and Requirements for Next Generation Access Technologies; (Release 15)", 3GPP TR 38.913 V15.0.0, Jun. 2018, pp. 1-39.

Holma et al., "LTE for UMTS OFDMA and SC-FDMA Based Radio Access", John Wiley & Sons, 2009, 232 pages.

Nokia et al., "Revised SID: Study on NR Industrial Internet of Things (IoT)", 3GPP TSG RAN meeting #81, RP-182090, Sep. 10-13, 2018, 5 pages.

\* cited by examiner

COMMUNICATIONS DEVICE, INFRASTRUCTURE EQUIPMENT, AND METHOD FOR DETERMINING A USE OF FIRST PHYSICAL RESOURCES AND SECOND PHYSICAL RESOURCES BASED ON A FIRST FORMAT INDICATOR AND A SECOND FORMAT INDICATOR

CROSS-REFERENCE TO RELATED APPLICATIONS

The present application is based on PCT filing PCT/EP2021/053897, filed Feb. 17, 2021, which claims priority to EP20158107.1, filed Feb. 18, 2020, the entire contents of each are incorporated herein by reference.

BACKGROUND

Field

The present disclosure relates to communications devices, infrastructure equipment and methods for transmitting and receiving data in a wireless communications network.

Description of Related Art

The background description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

Third and fourth generation mobile telecommunication systems, such as those based on the 3GPP defined UMTS and Long Term Evolution (LTE) architecture, are able to support more sophisticated services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy such networks is therefore strong and the coverage area of these networks, i.e. geographic locations where access to the networks is possible, may be expected to increase ever more rapidly.

Future wireless communications networks will be expected to support communications routinely and efficiently with a wider range of devices associated with a wider range of data traffic profiles and types than current systems are optimised to support. For example it is expected future wireless communications networks will be expected to efficiently support communications with devices including reduced complexity devices, machine type communication (MTC) devices, high resolution video displays, virtual reality headsets and so on. Some of these different types of devices may be deployed in very large numbers, for example low complexity devices for supporting the "The Internet of Things", and may typically be associated with the transmissions of relatively small amounts of data with relatively high latency tolerance.

In view of this there is expected to be a desire for future wireless communications networks, for example those which may be referred to as 5G or new radio (NR) system/new radio access technology (RAT) systems [1], as well as future iterations/releases of existing systems, to efficiently support connectivity for a wide range of devices associated with different applications and different characteristic data traffic profiles.

Systems incorporating NR technology are expected to support different services (or types of services), which may be characterised by different requirements for latency, data rate and/or reliability. For example, Enhanced Mobile Broadband (eMBB) and Ultra Reliable & Low Latency Communications (URLLC) services have a target for reliability of $1-10^{-5}$ (99.999%) or higher for one transmission of a 32 byte packet with a user plane latency of 1 ms [2]. In addition, systems may be expected to support further enhancements related to Industrial Internet of Things (IIoT) in order to support services with new requirements of high availability, high reliability, low latency, and in some cases, high-accuracy positioning.

Additionally, a Reduced Capability User Equipment (RC-UE) may be expected to have a complexity and cost that is between an eMTC/NB-IoT and a URLLC/eMBB user equipment (UE). Examples of RC-UE devices include industrial wireless sensors, video surveillance cameras and wearables [3]. Complexity may be reduced in an RC-UE by reducing the number of RX/TX antennas associated with the RC-UE, reducing the bandwidth associated with the RC-UE, relaxing the processing time of the RC-UE, relaxing the processing time of the RC-UE, and/or implementing a Half-Duplex-Frequency-Division Duplexing (HD-FDD) mode of operation. An HD-FDD device does not require a duplex filter and therefore has a reduced hardware complexity.

SUMMARY

The present disclosure can help address or mitigate at least some of the issues discussed above.

Embodiments of the present technique can provide a method of transmitting and receiving data by a communications device operating according to a Half Duplex Frequency Division Duplex mode of operation (HD-FDD) in a wireless communications network. The method comprising receiving from the wireless communications network a first allocation of first physical resources of an uplink channel of a wireless access interface provided by the wireless communications network for transmitting uplink data to the wireless communications network, and receiving from the wireless communications network a second allocation of second physical resources of a downlink channel of the wireless access interface for receiving downlink data from the wireless communications network. The method includes determining that one or more of the first physical resources of the uplink channel and the second communication resources of the downlink channel overlap in time, and determining, on a basis of a first format indicator for the uplink channel and a second format indicator for the downlink channel, a use of each of the one or more first physical resources and the one or more second physical resources which overlap in time. The first format indicator defines a format for each of the physical resources of the uplink channel, and the second format indicator defines a format for each of the physical resources of the downlink channel. Accordingly if an allocation of uplink and downlink resources overlaps in time, the communications device can resolve a conflict between the overlapping resources, which it cannot use at the same time as a result of being configured to operate in an HD-FDD mode.

According to some examples the determined use of each of the one or more first physical resources and the one or more second physical resources which overlap in time can include selecting, on a basis of the first format indicator for the uplink channel and the second format indicator for the downlink channel either to transmit on the one or more of the first physical resources of the uplink channel which overlap with the one or more second physical resources of the downlink channel, or to receive on the one or more of the second physical resources of the downlink channel which overlap the one or more of the first physical resources of the uplink channel. The first format indicator defines a format for each of the physical resources of the uplink channel, and the second format indicator defines a format for each of the physical resources of the downlink channel. For example the format indicators could designate each physical resource as uplink, downlink or flexible. In one example the format indicators are slot format indicators (SFI), which are examples of indicators. The selecting on the basis of the first format indicator and the second format indicator comprises combining for each of the one of more first physical resources of the uplink channel and the one or more second physical resources of the downlink channel which overlap in time, the defined format from the first format indicator and the second format indicator, and determining a use of each of the physical resources which overlap according to a predetermined rule. The combining can form a dual SFI which can be applied to a lookup table to determine how the physical resources in conflict can be used.

In some examples the first format indicator for an uplink channel and the second format indicator for the downlink channel may be received from the wireless communications network.

The present inventors have recognised that implementing an HD-FDD mode of operation in an RC-UE may lead to contention problems between uplink transmission and downlink reception between the RC-UE and a network particularly when the RC-UE is configured with an NR service which requires low latency such as URLLC. The implementation of the HD-FDD mode of operation in order to reduce the complexity of a UE configured with low latency NR services therefore represents a technical challenge.

Respective aspects and features of the present disclosure are defined in the appended claims.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and.

DETAILED DESCRIPTION OF THE EMBODIMENTS

Long Term Evolution Advanced Radio Access Technology (4G)

Figure 1:
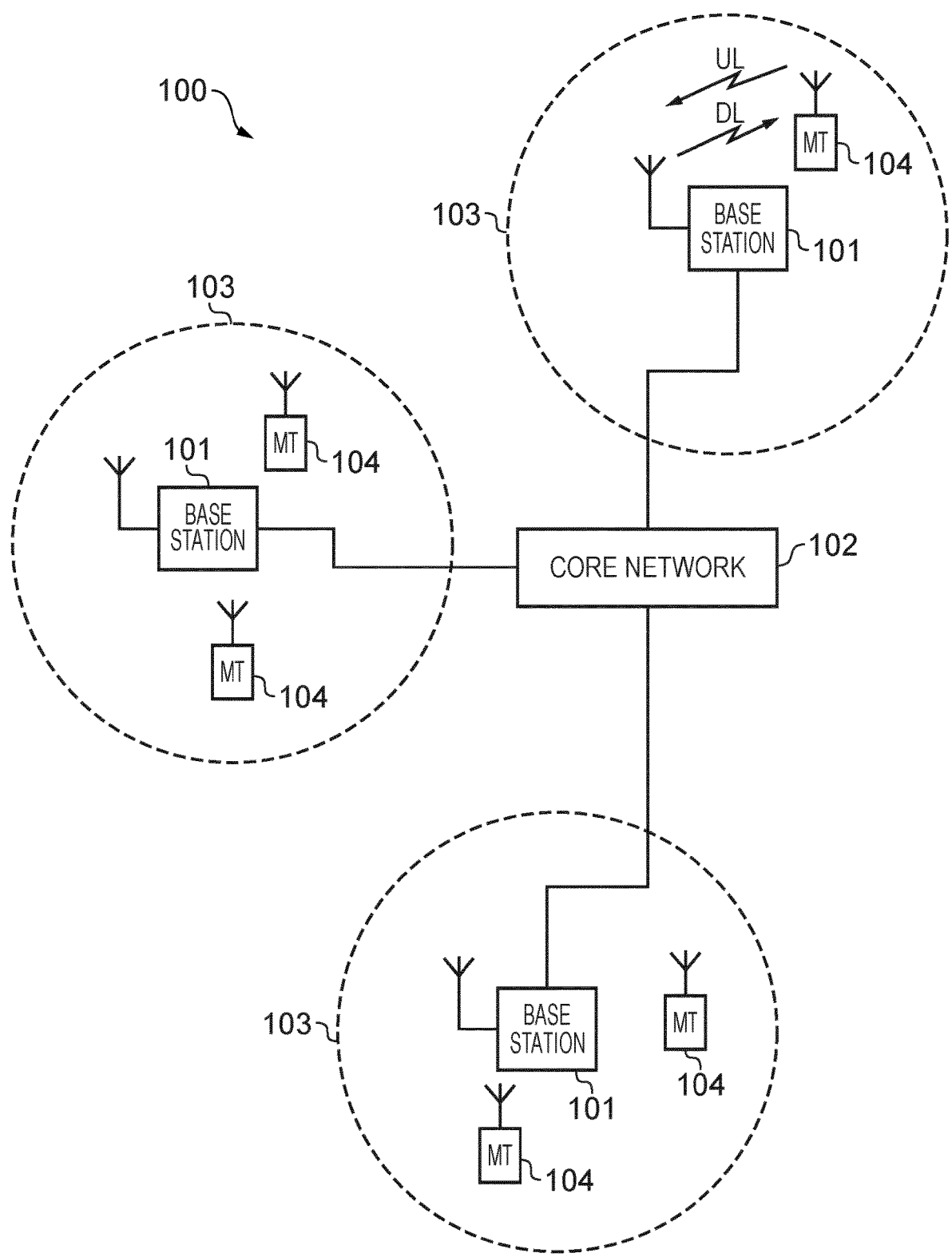
FIG. 1 schematically represents some aspects of an LTE-type wireless telecommunication system which may be configured to operate in accordance with certain embodiments of the present disclosure.

FIG. 1 provides a schematic diagram illustrating some basic functionality of a mobile telecommunications network/system 100 operating generally in accordance with LTE principles, but which may also support other radio access technologies, and which may be adapted to implement embodiments of the disclosure as described herein. Various elements of FIG. 1 and certain aspects of their respective modes of operation are well-known and defined in the relevant standards administered by the 3GPP (RTM) body, and also described in many books on the subject, for example, Holma H. and Toskala A [4]. It will be appreciated that operational aspects of the telecommunications networks discussed herein which are not specifically described (for example in relation to specific communication protocols and physical channels for communicating between different elements) may be implemented in accordance with any known techniques, for example according to the relevant standards and known proposed modifications and additions to the relevant standards.

The network 100 includes a plurality of base stations 101 connected to a core network part 102. Each base station provides a coverage area 103 (e.g. a cell) within which data can be communicated to and from communications devices 104. Data is transmitted from the base stations 101 to the communications devices 104 within their respective coverage areas 103 via a radio downlink Data is transmitted from the communications devices 104 to the base stations 101 via a radio uplink. The core network part 102 routes data to and from the communications devices 104 via the respective base stations 101 and provides functions such as authentication, mobility management, charging and so on. Communications devices may also be referred to as mobile stations, user equipment (UE), user terminals, mobile radios, terminal devices, and so forth. Base stations, which are an example of network infrastructure equipment/network access nodes, may also be referred to as transceiver stations/nodeBs/e-nodeBs, g-nodeBs (gNB) and so forth. In this regard different terminology is often associated with different generations of wireless telecommunications systems for elements providing broadly comparable functionality. However, example embodiments of the disclosure may be equally implemented in different generations of wireless telecommunications systems such as 5G or new radio as explained below, and for simplicity certain terminology may be used regardless of the underlying network architecture. That is to say, the use of a specific term in relation to certain example implementations is not intended to indicate these implementations are limited to a certain generation of network that may be most associated with that particular terminology.

New Radio Access Technology (5G)

Figure 2:
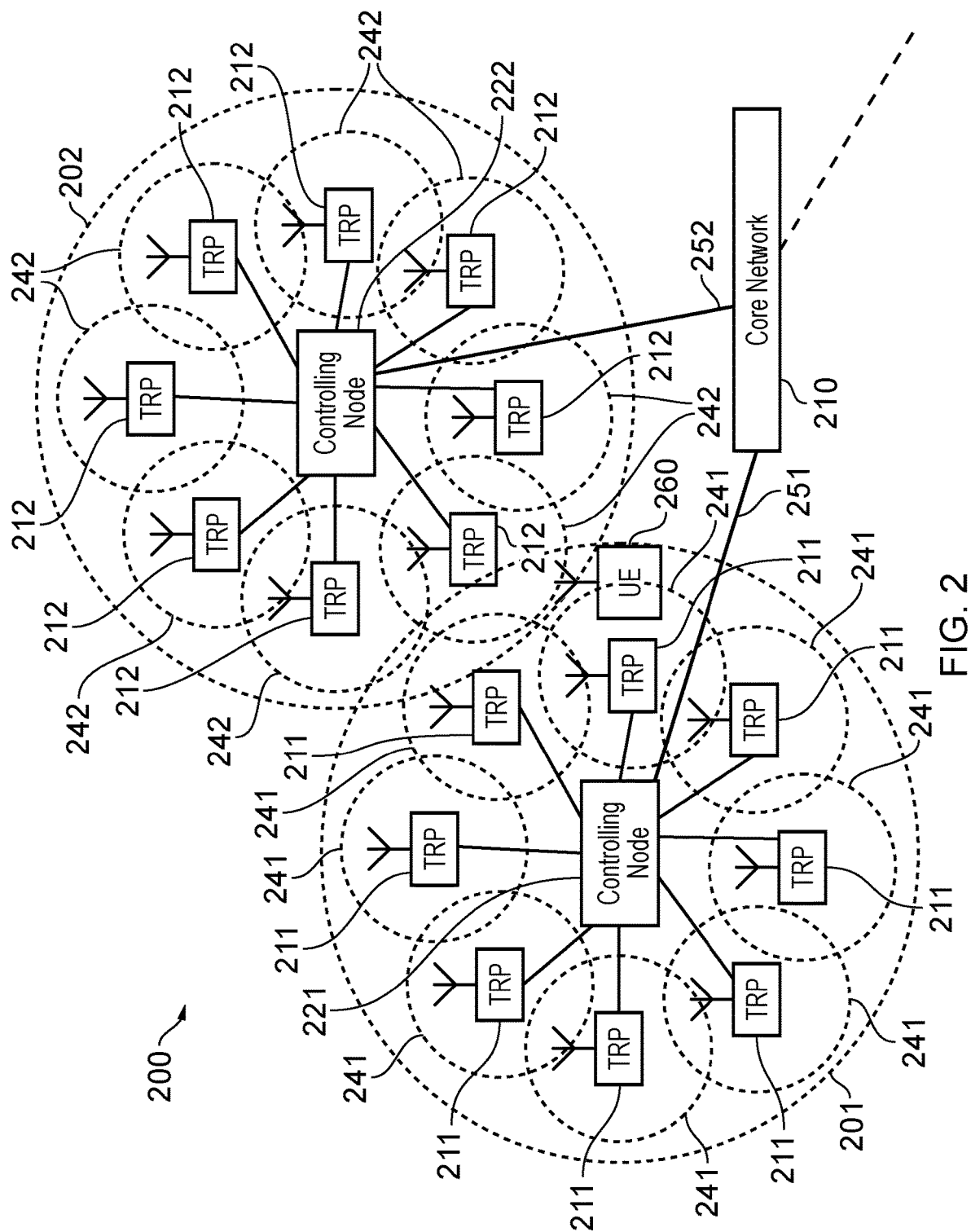
FIG. 2 schematically represents some aspects of a new radio access technology (RAT) wireless telecommunications system which may be configured to operate in accordance with certain embodiments of the present disclosure.

FIG. 2 is a schematic diagram illustrating a network architecture for a new RAT wireless communications network/system 200 based on previously proposed approaches which may also be adapted to provide functionality in accordance with embodiments of the disclosure described herein. The new RAT network 200 represented in FIG. 2 comprises a first communication cell 201 and a second communication cell 202. Each communication cell 201, 202, comprises a controlling node (centralised unit) 221, 222 in communication with a core network component 210 over a respective wired or wireless link 251, 252. The respective controlling nodes 221, 222 are also each in communication with a plurality of distributed units (radio access nodes/ remote transmission and reception points (TRPs)) 211, 212 in their respective cells. Again, these communications may be over respective wired or wireless links. The distributed units 211, 212 are responsible for providing the radio access interface for communications devices connected to the network. Each distributed unit 211, 212 has a coverage area (radio access footprint) 241, 242 where the sum of the coverage areas of the distributed units under the control of a controlling node together define the coverage of the respective communication cells 201, 202. Each distributed unit 211, 212 includes transceiver circuitry for transmission and reception of wireless signals and processor circuitry configured to control the respective distributed units 211, 212.

In terms of broad top-level functionality, the core network component 210 of the new RAT communications network represented in FIG. 2 may be broadly considered to correspond with the core network 102 represented in FIG. 1, and the respective controlling nodes 221, 222 and their associated distributed units/TRPs 211, 212 may be broadly considered to provide functionality corresponding to the base stations 101 of FIG. 1. The term network infrastructure equipment/access node may be used to encompass these elements and more conventional base station type elements of wireless communications systems. Depending on the application at hand the responsibility for scheduling transmissions which are scheduled on the radio interface between the respective distributed units and the communications devices may lie with the controlling node/centralised unit and/or the distributed units/TRPs.

A communications device or UE 260 is represented in FIG. 2 within the coverage area of the first communication cell 201. This communications device 260 may thus exchange signalling with the first controlling node 221 in the first communication cell via one of the distributed units 211 associated with the first communication cell 201. In some cases communications for a given communications device are routed through only one of the distributed units, but it will be appreciated that in some other implementations communications associated with a given communications device may be routed through more than one distributed unit, for example in a soft handover scenario and other scenarios.

In the example of FIG. 2, two communication cells 201, 202 and one communications device 260 are shown for simplicity, but it will of course be appreciated that in practice the system may comprise a larger number of communication cells (each supported by a respective controlling node and plurality of distributed units) serving a larger number of communications devices.

It will further be appreciated that FIG. 2 represents merely one example of a proposed architecture for a new RAT communications system in which approaches in accordance with the principles described herein may be adopted, and the functionality disclosed herein may also be applied in respect of wireless communications systems having different architectures.

Thus example embodiments of the disclosure as discussed herein may be implemented in wireless telecommunication systems/networks according to various different architectures, such as the example architectures shown in FIGS. 1 and 2. It will thus be appreciated that the specific wireless communications architecture in any given implementation is not of primary significance to the principles described herein. In this regard, example embodiments of the disclosure may be described generally in the context of communications between network infrastructure equipment/access nodes and a communications device, wherein the specific nature of the network infrastructure equipment/access node and the communications device will depend on the network infrastructure for the implementation at hand. For example, in some scenarios the network infrastructure equipment/ access node may comprise a base station, such as an LTE-type base station 101 as shown in FIG. 1 which is adapted to provide functionality in accordance with the principles described herein, and in other examples the network infrastructure equipment/access node may comprise a control unit/controlling node 221, 222 and/or a TRP 211, 212 of the kind shown in FIG. 2 which is adapted to provide functionality in accordance with the principles described herein.

Figure 3:
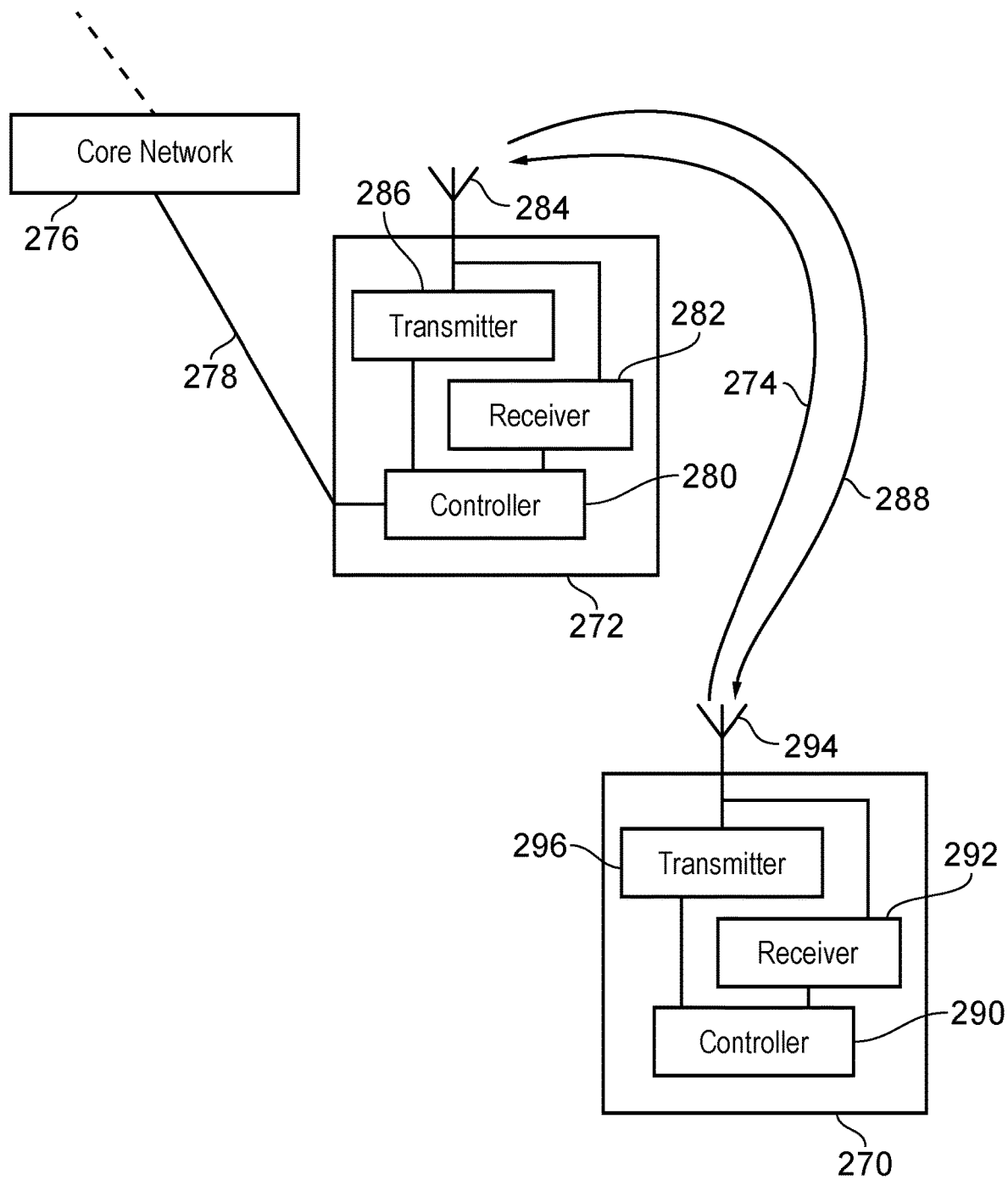
FIG. 3 is a schematic block diagram of an example infrastructure equipment and communications device which may be configured in accordance with example embodiments.

A more detailed illustration of a UE/communications device 270 (which may correspond to a communications device such as the communications device 260 of FIG. 2 or the communications device 104 of FIG. 1) and an example network infrastructure equipment 272, which may be thought of as a gNB 101 or a combination of a controlling node 221 and TRP 211, is presented in FIG. 3. As shown in FIG. 3, the UE 270 is shown to transmit uplink data to the infrastructure equipment 272 via uplink resources of a wireless access interface as illustrated generally by an arrow 274 from the UE 270 to the infrastructure equipment 272. The UE 270 may similarly be configured to receive downlink data transmitted by the infrastructure equipment 272 via downlink resources as indicated by an arrow 288 from the infrastructure equipment 272 to the UE 270. As with FIGS. 1 and 2, the infrastructure equipment 272 is connected to a core network 276 via an interface 278 to a controller 280 of the infrastructure equipment 272. The infrastructure equipment 272 includes a receiver 282 connected to an antenna 284 and a transmitter 286 connected to the antenna 284. Correspondingly, the UE 270 includes a controller 290 connected to a receiver 292 which receives signals from an antenna 294 and a transmitter 296 also connected to the antenna 294.

The controller 280 is configured to control the infrastructure equipment 272 and may comprise processor circuitry which may in turn comprise various sub-units/sub-circuits for providing functionality as explained further herein. These sub-units may be implemented as discrete hardware elements or as appropriately configured functions of the processor circuitry. Thus the controller 280 may comprise circuitry which is suitably configured/programmed to provide the desired functionality using conventional programming/configuration techniques for equipment in wireless telecommunications systems. The transmitter 286 and the receiver 282 may comprise signal processing and radio frequency filters, amplifiers and circuitry in accordance with conventional arrangements. The transmitter 286, the receiver 282 and the controller 280 are schematically shown in FIG. 3 as separate elements for ease of representation. However, it will be appreciated that the functionality of these elements can be provided in various different ways, for example using one or more suitably programmed programmable computer(s), or one or more suitably configured application-specific integrated circuit(s)/circuitry/chip(s)/chipset(s). As will be appreciated the infrastructure equipment 272 will in general comprise various other elements associated with its operating functionality.

Correspondingly, the controller 290 of the UE 270 is configured to control the transmitter 296 and the receiver 292 and may comprise processor circuitry which may in turn comprise various sub-units/sub-circuits for providing functionality as explained further herein. These sub-units may be implemented as discrete hardware elements or as appropriately configured functions of the processor circuitry. Thus the controller 290 may comprise circuitry which is suitably configured/programmed to provide the desired functionality using conventional programming/configuration techniques for equipment in wireless telecommunications systems. Likewise, the transmitter 296 and the receiver 292 may comprise signal processing and radio frequency filters, amplifiers and circuitry in accordance with conventional arrangements. The transmitter 296, receiver 292 and controller 290 are schematically shown in FIG. 3 as separate elements for ease of representation. However, it will be appreciated that the functionality of these elements can be provided in various different ways, for example using one or more suitably programmed programmable computer(s), or one or more suitably configured application-specific integrated circuit(s)/circuitry/chip(s)/chipset(s). As will be appreciated the communications device 270 will in general comprise various other elements associated with its operating functionality, for example a power source, user interface, and so forth, but these are not shown in FIG. 3 in the interests of simplicity.

The controllers 280, 290 may be configured to carry out instructions which are stored on a computer readable medium, such as a non-volatile memory. The processing steps described herein may be carried out by, for example, a microprocessor in conjunction with a random access memory, operating according to instructions stored on a computer readable medium.

Frequency Division Duplexing

Figure 4:
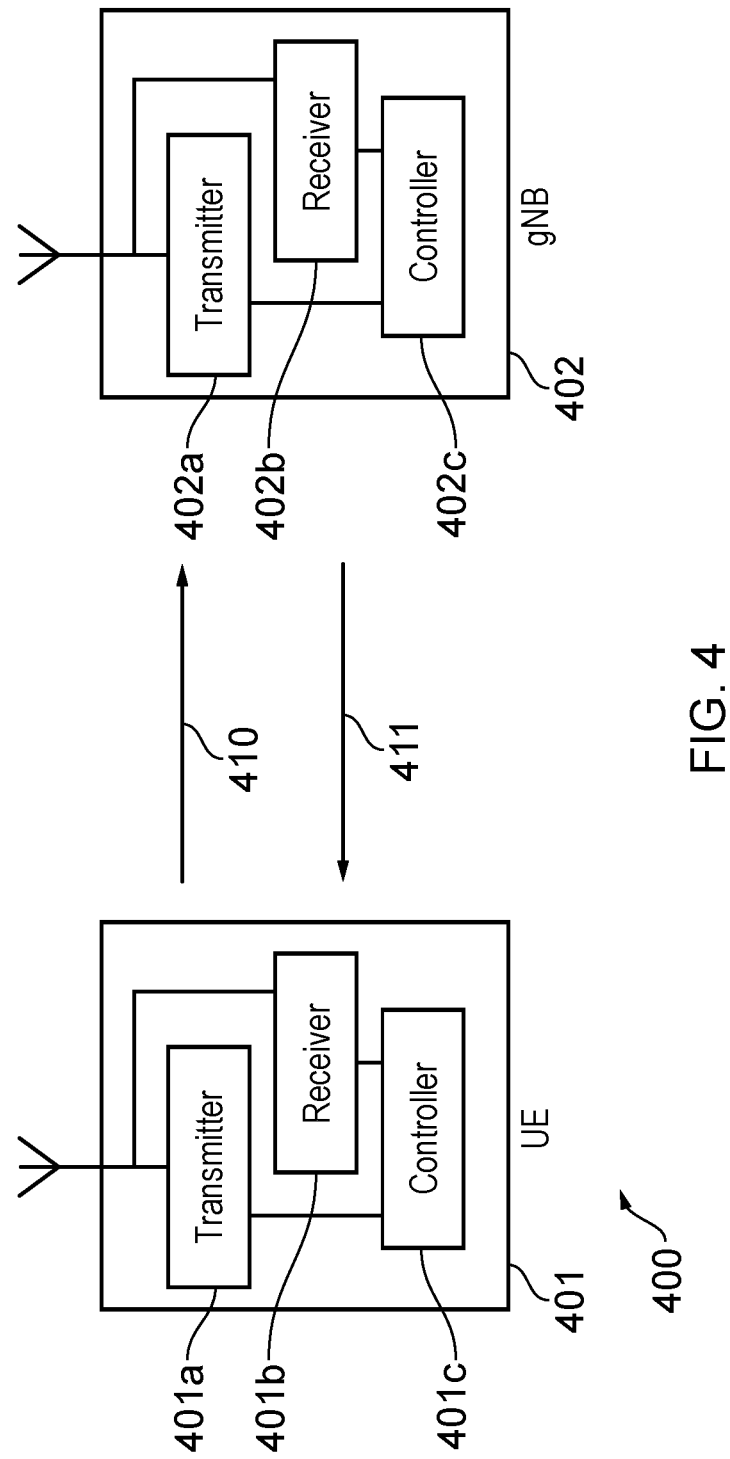
FIG. 4 illustrates full duplex communications in accordance with conventional techniques.

Duplex communications refers to the ability of a device to both transmit and receive data. For example, a communications device (such as the communications device 270 of FIG. 3) may communicate in a duplex manner with the infrastructure equipment 270 by transmitting signals 288 to the infrastructure equipment 272 and by receiving signals 274, transmitted by the infrastructure equipment 272. Duplex communications can either be full duplex (FD) or half-duplex (HD). FIG. 4 shows a system 400 comprising a communications device 401, configured with a transmitter 401a, a receiver 401b and a controller 401c, communicating in a full duplex manner with a gNB 402 configured with a transmitter 402a, a receiver 402b and a controller 402c. The transmission of data from the communications device 401 to the gNB 402 is represented by an arrow 410 from the communications device 401 to the gNB 402. The reception of data by the communications device 401 from the gNB 402 is represented by the arrow 411 from the gNB 402 to the communications device 401. As illustrated in FIG. 4, the communications device 401 can both transmit 410 and receive 411 data to/from the gNB 402 simultaneously.

Figure 5:
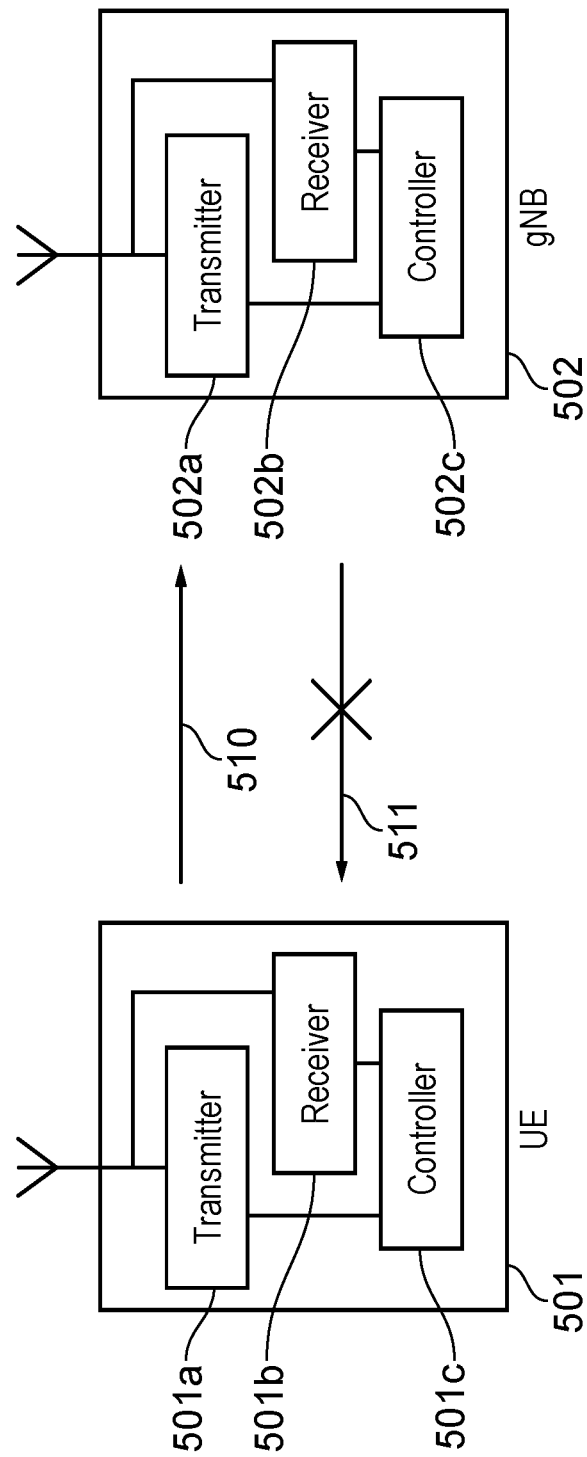
FIG. 5 illustrates half duplex communications in accordance with conventional techniques, which may be adapted in accordance with embodiments of the present disclosure.

By contrast, FIG. 5 illustrates half duplex communications. FIG. 5 shows a system comprising a communications device 501 configured with a transmitter 501a, a receiver 501b and a controller 501c communicating with a gNB 502 configured with a transmitter 502a, a receiver 502b and a controller 502c. The transmission of data from the communications device 501 to the gNB 502 is represented by an arrow 510 from the communications device 501 to the gNB 502. The reception of data by the communications device 501 from the gNB 502 is represented by an arrow 511 from the gNB 502 to the communications device 501. As illustrated in FIG. 5, the communications device 501 cannot transmit 510 and receive 511 data simultaneously. In this case, data cannot be transmitted from the gNB 502 to the communications device 501 until the transmission of data from the communications device 501 to the gNB 502 has stopped.

Frequency Division Duplexing (FDD) is a known technique to allow duplex communication, whereby a transmitter and receiver within a device operate at different carrier frequencies. Accordingly, a transmitter of a communications device, for example, may transmit at one frequency while a receiver of the communications device receives at a different frequency. The transmission and reception frequencies are separated by a frequency offset. In other words, for the FDD, a downlink and an uplink communication are operated in different frequency bands/carriers (referred to as paired frequency carriers). It will be appreciated by a person skilled in the art that references to the phrases "a frequency band" or "band of frequencies" disclosed herein may be replaced by the phrase "carrier". For example, a first band of frequencies may refer to an uplink carrier whereas a second band of frequencies may refer to a downlink carrier. Furthermore, Time Division Duplexing (TDD) is a known technique whereby the transmitter and receiver of a device operate at the same carrier frequency but the transmission and reception of signals are separated in time. In other words, for TDD, a downlink and an uplink communication are operated in the same frequency band/carrier (referred to as unpaired frequency carriers).

In accordance with some embodiments described herein, a communications device which is capable of half duplex communications and which is not capable of full-duplex communications, such as the communications device 501 in FIG. 5, may be expected to communicate according to an FDD mode of operation. Such a communications device may be referred to as a Half-Duplex-Frequency-Division-Duplexing (HD-FDD) device.

Figure 6:
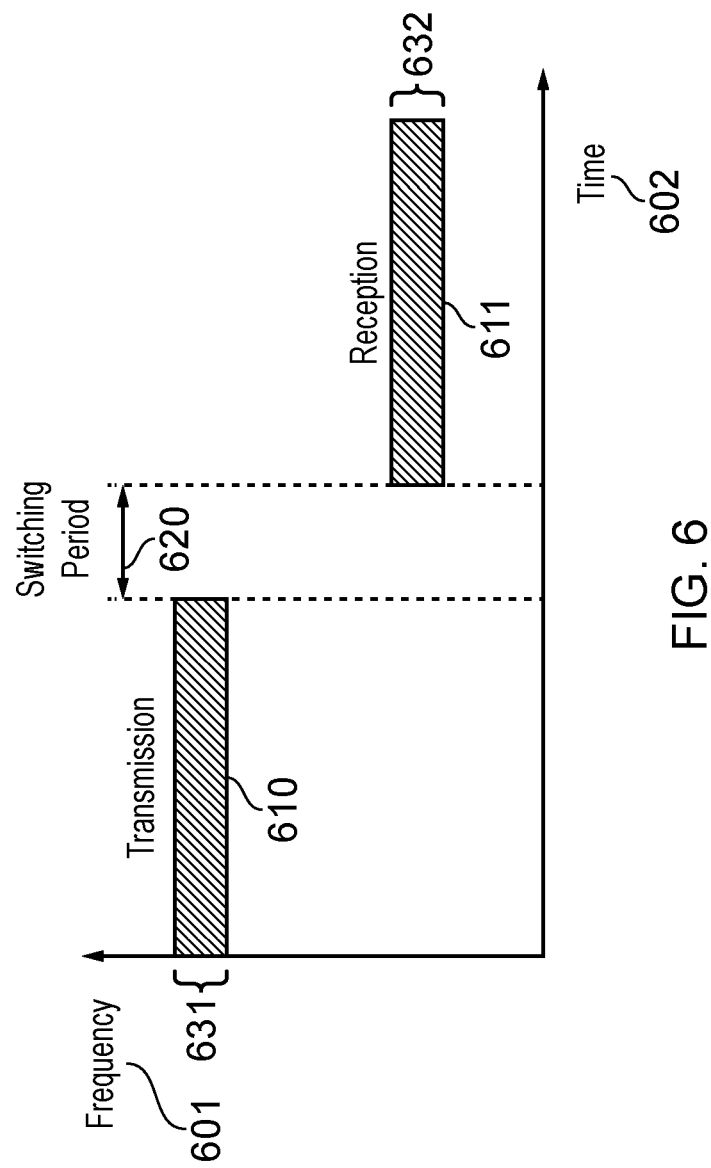
FIG. 6 shows an illustrative example of communication resources used by a half-duplex frequency division duplex (HD-FDD) device.

FIG. 6 shows an illustrative example of communication resources used by an HD-FDD device. In particular, FIG. 6 shows a representation of communication resources in a frequency domain 601 and a time domain 602. During a transmission period 610 a transmitter, such as the transmitter 501a of the communications device 501 in FIG. 5, can transmit data in a first band of frequencies 631 (in other words, a first carrier) to an infrastructure equipment, such as the gNB 502 in FIG. 5. During a reception period 611 a receiver, such as the receiver 501b of the communications device 501 in FIG. 5, can receive data from an infrastructure equipment in a second band of frequencies 632 (in other words, a second carrier), such as the gNB 502 in FIG. 5.

It will be appreciated by a person skilled in the art that the transmission 610 from the communications device 501 to the gNB 502 is an example of uplink transmission and the reception 611 by the communications device 501 from the gNB 502 is an example of downlink reception. It will also be appreciated that the communications device 501 could be a user equipment (UE).

In the example in FIG. 6, there is a switching period 620 (which may also be referred to as a transmission/reception period) between the transmission 610 and the reception 611. That is, there is a time delay 620 between the transmission 631 and reception 611 of data.

Generally therefore, compared with full duplex communication, additional latency in transmitting or receiving data can arise when using half duplex transmission because of the requirement to wait for any ongoing reception or transmission (respectively) to be completed and because of the switching period 620.

HD-FDD devices may be eMTC and/or NB-IoT communications devices (or may operate in accordance with eMTC or NB-IoT principles) whereby the latency requirements do not impose a stringent latency requirement, as discussed above. In such cases, the additional latency associated with half duplex operation may be acceptable for an HD-FDD communications device.

Some services in 5G NR require a low latency, such as URLLC, and the latency 620 introduced by switching between transmission 610 and reception 602 in a HD-FDD device may have a relatively large impact on the service.

In a communication system, there may be a need for a communications device to both transmit and receive data. Where full duplex is possible, simultaneous uplink and downlink communications resources may be scheduled. However, if the communications device is half duplex, then it is necessary for the infrastructure equipment to avoid conflicts between uplink and downlink resources allocated to the same communications device, because transmission and reception cannot occur simultaneously in accordance with the half duplex capability of the communications device. A collision (referred to herein as an 'intra-UE HD-FDD collision) may arise when first communication resources are to be used for transmission by an HD-FDD communications device, and second communication resources are to be used for reception by the same communications device, wherein the first and second communication resources are such that the HD-FDD communications device is unable to use both communication resources. An intra-UE HD-FDD collision may arise because the first and second communications resources overlap (at least partially) in time and/or because the first and second communications resources are not separated in time by the minimum required switching time 620.

There may arise a case where communications resources are scheduled and allocated before the infrastructure equipment is aware of the need for a high priority/low latency transmission in the opposite direction. To avoid an intra-UE HD-FDD collision, the infrastructure equipment would not be able to allocated resources which conflict with the existing schedule, and it may therefore not be possible to meet latency requirements for the high priority/low latency transmission. In accordance with some embodiments of the present technique, the infrastructure equipment may schedule the high priority/low latency data in order to satisfy its latency requirements, thereby resulting in an intra-UE HD-FDD collision.

It has also been recognised that in some cases, communication resources may be wholly or partially autonomously selected by the communications device. For example, where predetermined communications resources are allocated (e.g. by means of semi-persistent scheduling, or for random access transmissions), the infrastructure equipment may not be aware of the selection of potentially conflicting communication resources by the communications device.

There may thus arise a possibility for an intra-UE HD-FDD collision, and there arises a technical problem of how to resolve such collisions.

Intra-UE HD-FDD Collision

Figure 7:
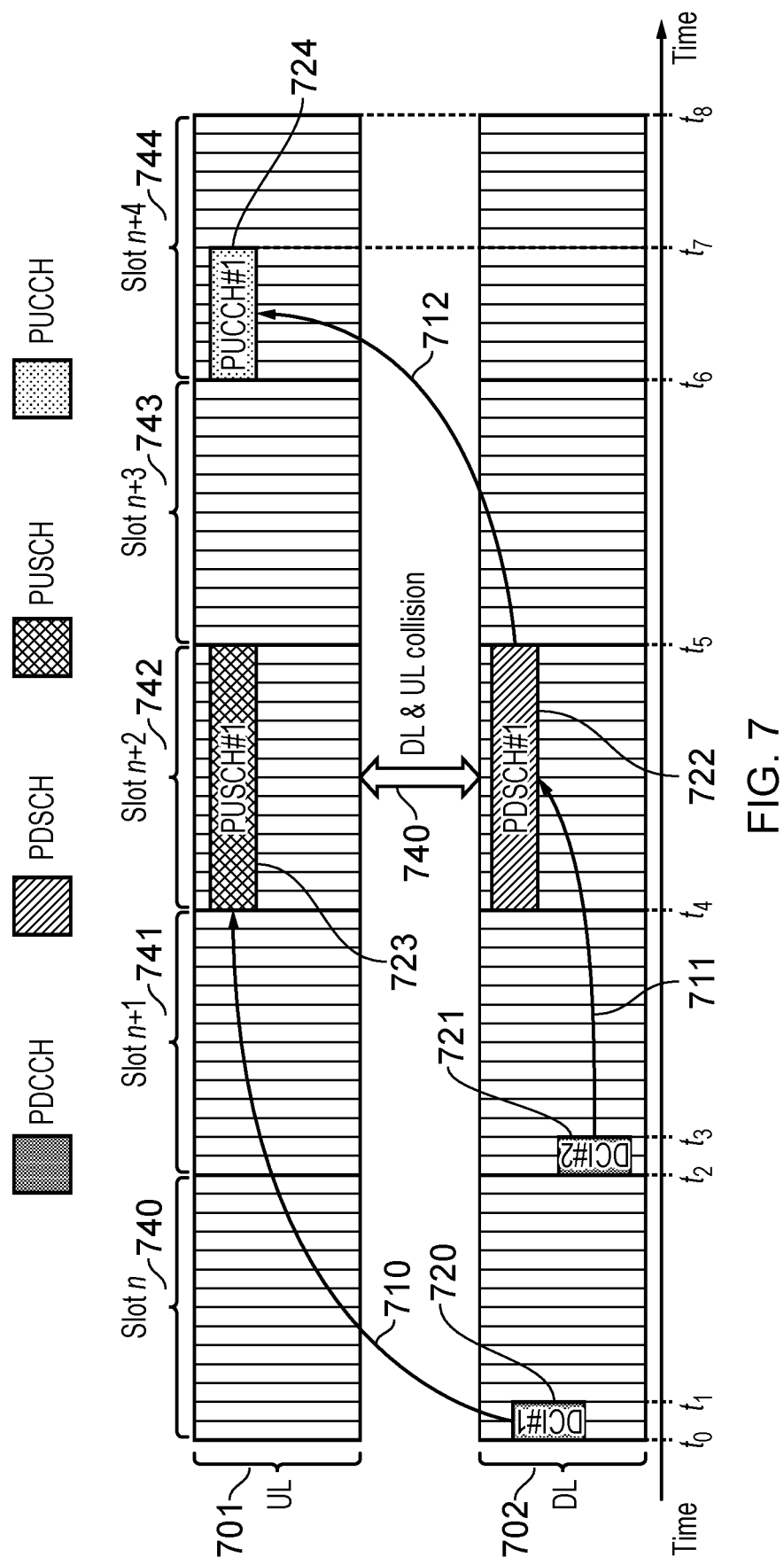
FIG. 7 shows an illustrative example of an intra-user equipment (UE) FDD collision between an uplink and a downlink transmission which may occur in an HD-FDD device.

FIG. 7 shows an illustrative example of an intra-UE FDD collision or conflict between an uplink transmission and a downlink reception which may occur in a HD-FDD device. The device may be configured with a service having low latency requirements, such as URLLC. In some examples, the device may be configured with more than one service. An example of a scenario to which FIG. 7 may be applicable is a conflict between a scheduled uplink transmission and a scheduled downlink reception between a UE and a wireless communications network.

FIG. 7 shows a first band of frequencies 701 configured for transmitting data to the wireless communications network. The communication resources within the first band of frequencies 701 are divided into time slots in the time domain. In FIG. 7, five separate time slots 740-744 associated with the first band of frequencies are shown. In this example, each time slot is divided into 14 time units. Each time unit may correspond to, for example, an Orthogonal Frequency Division Multiplexing (OFDM) symbol period. It will be appreciated that a different number of time units in a time slot, and a different number of time slots into which the first band of frequencies is divided are also possible.

FIG. 7 also shows a second band of frequencies 702 configured for receiving data from the wireless communications network. The second band of frequencies 702 is divided into time slots, which are aligned with the time slots 740-744 used for the resources within the first band of frequencies 701. In this example, each time slot is divided into 14 time units. Each time unit may correspond to, for example, an OFDM symbol period. It will be appreciated that a different number of time units in a time slot, and a different number of time slots into which the second band of frequencies is divided can be configured.

In the illustrative example in FIG. 7, a wireless communication network provides a first allocation 720, on the second band of frequencies 702, of first communication resources 723 to the UE at time t0. In the specific example, the first allocation 720 is downlink control information (DCI #1). The first allocation 720 schedules first communication resources 723 for a transmission of data by the UE to the wireless communications network on the first band of frequencies 701 from time t4 to t5, as shown by an arrow 710. In the specific example, the transmission of data using the first communication resources 723 occurs on a Physical Uplink Shared Channel #1 (PUSCH #1).

At a time t2, after time t1, the UE receives from the wireless communications network, on the second band of frequencies 702, a second allocation 721 of second communication resources 722 to the UE. In the specific example, the second allocation 721 is DCI #2. The second allocation 721 allocates (as indicated by an arrow 711) second communication resources 722 for the reception of data by the UE from the wireless communications network between t4 and t5. In the specific example, the reception of data on the second communication resources 722 occurs on a Physical Downlink Shared Channel (PDSCH). In the example of FIG. 7, the second allocation 721 also schedules (as shown by an arrow 712) third communication resources 724 starting at time t6 for a transmission of data from the UE to the wireless communications network. The data transmitted on the third communication resources 724 may include hybrid automatic repeat request (HARQ) acknowledgement (ACK) feedback information and may be transmitted on a Physical Uplink Control Channel (PUCCH). This data may include hybrid automatic repeat request (HARQ)-acknowledgement (ACK) feedback information.

In some embodiments, the second allocation 721 is transmitted in response to determining, by the infrastructure equipment 272, that downlink data having a low latency tolerance (e.g. because it is URLLC data) is to be transmitted to the communications device 270. The infrastructure equipment 272 determines that it is necessary to schedule the transmission of the downlink data within a certain time period (e.g. so that it is completely transmitted before time t5), and allocates the second communication resources 722 accordingly.

As will be appreciated from FIG. 7, resources for the scheduled transmission of data 723 and the scheduled reception of data 722 have both been allocated between t4 and t5. Since the UE in this example is an HD-FDD device, the device cannot simultaneously transmit and receive data. Therefore an intra-UE HD-FDD collision 740 occurs. As described above, the intra-UE HD-FDD collision 740 may arise because the infrastructure equipment 272 has determined that it is necessary to allocate the second communication resources 722 for downlink transmission to the communications device 270. However, the present disclosure is not limited to any particular cause of the intra-UE HD-FDD collision. In particular, it should be appreciated that in some embodiments, the infrastructure equipment 272 allocates the second communication resources 722 for downlink transmission to the communications even though they may be incompatible with the first communications resources 723 allocated earlier.

As will be appreciated from the example embodiments described below for which FIG. 7 provides an example representation of an FDD wireless access interface physical resources of the uplink channel may be divided into a plurality of time slots, each time slot including a plurality of the physical resources of the uplink channel, such as OFDM symbols, and the physical resources of the downlink channel may be divided into a plurality of time slots, each time slot including a plurality of the physical resources of the downlink channel such as OFDM symbols. Although FIG. 7 and the following example provide an example that the time slots are synchronised on the uplink channel and the downlink channel, so that the plurality of time slots are the same, in other examples the time slots may be different in duration and numbers of OFDM symbols. However allocations of resource on the uplink and the downlink may also overlap in time.

The efficient handling of cases where intra-UE DL and UL transmissions collide in a communications device operating according to an HD-FDD mode of operation therefore represents a technical challenge.

The following described implementations may be applied when a communications device is configured with two different services. For example, a communications device may be configured with eMBB and URLLC. However, it will be appreciated that the present disclosure is not limited to the case when a communications device is configured with two different services, and may be applied to cases where the communications device is configured with one service or more than two services.

Slot Format

Slot format indicators (SFIs) have been used in the context of TDD. In this context, an SFI is used to indicate a format of the OFDM symbols in a slot. It is known that in TDD systems other than NR, there are cases where all OFDM symbols in the same slot must have the same format. For example, for an uplink transmission on a slot of first physical resources, all of the symbols in the slot have the format "U" (uplink). Similarly, for a downlink reception on a slot of second physical resources, all of the symbols in the slot have the format "D" (downlink) By contrast, it is a feature of NR that each of the symbols in a slot can have different indicated formats. The format of each symbol may be indicated as U, D or "F" (flexible). A flexible symbol supports both uplink transmission and downlink reception. The present invention reuses the slot format indicator in FDD in order to determine a priority between uplink transmission and downlink reception in a HD-FDD device. It is known in the art that individual OFDM symbols in a time slot can be classified with a defined application such as for example: 'downlink', 'uplink' or 'flexible'. The slot formats can be determined by Radio Resource Control (RRC) signalling and/or DCI signalling. For example, a DCI signal sent from a wireless communications network to a communications device may contain a Slot format Indicator (SFI) or communication resources allocated to the communications device for uplink and/or downlink transmission. The allocated communication resources may be communication resources allocated for uplink (UL grant) or communication resources allocated for downlink (DL grant).

Slot format indicators have been used in the context of TDD. As explained above, in TDD, uplink transmission and downlink reception occur on the same carrier frequency, but separated in time. In a TDD mode of operation, at any point in time, all of the communications devices in a cell must be in an uplink communication mode or all of the communications devices in a cell must be in a downlink communication mode. In the uplink communication mode, a communications device in the cell cannot receive downlink data. In a downlink communication mode, the communications device in the cell cannot transmit uplink data. In the context of TDD, a single SFI can be indicated for an entire cell.

In accordance with some embodiments provided herein, in an FDD mode of operation, an SFI is independently indicated for a first band of frequencies configured for uplink transmission and a second band of frequencies configured for downlink reception. Each SFI may be indicated, for example, by means of a Group Common Physical Downlink Control Channel (GC-PDCCH). The combination of the two independently received SFIs is referred to as a dual SFI. As will be appreciated the first band of frequencies is used for transmitting uplink signals, whereas the second band of frequencies is used for receiving downlink signals. The present disclosure seeks to reuse the SFI to resolve intra-UE FDD collision when an uplink transmission allocated on the first band of frequencies overlaps in time with a downlink transmission allocated on the second band of frequencies.

In accordance with some of the embodiments described herein, the dual SFI may be used by the communications device to determine whether uplink transmission or downlink reception has priority. In particular, the dual SFI may be used by the communications device to determine whether to:

If a scheduled uplink and downlink transmission collides, the combined SFI is used by the communications device to determine whether to drop the uplink transmission and use the downlink transmission or to drop the downlink transmission and use the uplink transmission. According to the illustrative example of FIG. 7, the dual SFI is used by the communications device to determine whether the communications device should transmit data on the PUSCH 723 and drop the reception of data on the PDSCH 722 or whether to receive data on the PDSCH 722 and drop transmission of data in the PUSCH 723.

Cancel a scheduled transmission or reception of data

Figure 8:
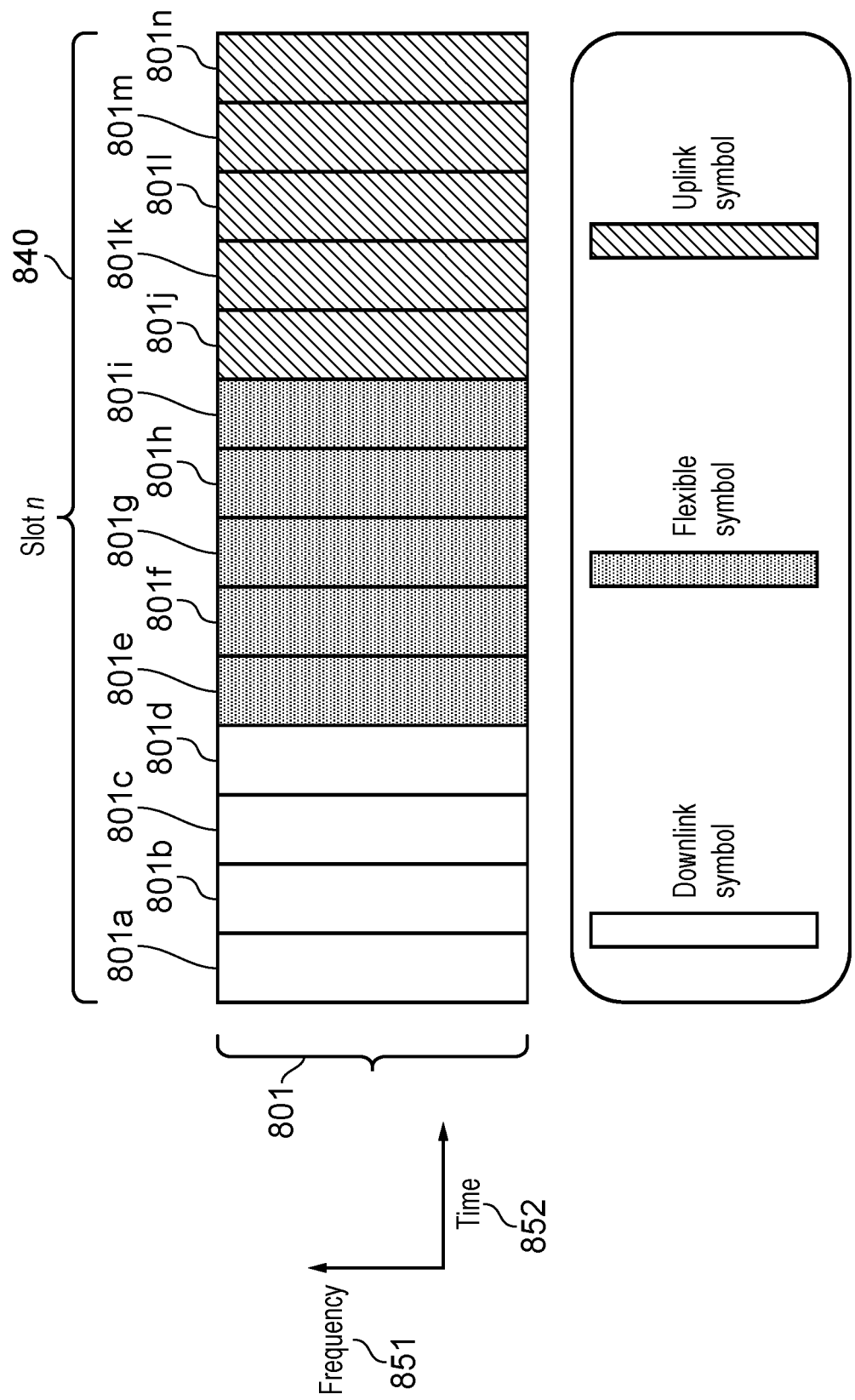
FIG. 8 is an illustrative example of communication resources of a frequency band which may be configured to transmit uplink data or receive downlink data according to an example embodiment.

Switch from an ongoing uplink transmission to a downlink transmission or vice versa UE Behaviour in the Case of a Collision Between UL Transmission and DL Reception FIG. 8 shows a Frequency 851 against Time 852 graph illustrating an example of communication resources of a band of frequencies 801 which may be configured for the transmission of data from a communications device to a wireless communications network or for the reception of data by a communications device from a wireless communications network. The figure shows a single FDD time slot n 840 occupying the band of frequencies 801. The time slot n 840 is divided into 14 time units 801*a*-801*n*. The time units may each correspond to an OFDM symbol period for example. It will be appreciated that a different number of time units in a time slot of the band of frequencies can be configured.

The band of frequencies 801 in FIG. 8 may correspond to first physical communication resources configured for transmitting uplink data. Alternatively, the band of frequencies 801 may correspond to second communication resources configured for receiving downlink data. The band of frequencies comprises a plurality of OFDM symbols 801*a*-801*n*. From this point forward, the word "symbol" should be understood to convey the meaning of "OFDM symbol".

FIG. 8 also shows an indication of the format of the symbols of the band of frequencies 801 indicated by an SFI. The labelling of the symbols is not intended to specify that a particular communications resource is used for uplink or downlink but is intended to show the indication of the format of the symbols in the SFI. For example, four of the symbols 801*a*-801*d* are indicated as downlink symbols, five of the symbols 801*e*-801*i* are indicated as flexible symbols and five of the symbols 801*j*-801*n* are indicated as uplink symbols. In this example, if the band of frequencies 801 is configured for transmitting uplink data, then it is not implied that a downlink reception is intended on the symbols indicated as downlink symbols 801*a*-801*d* in the band of frequencies 801. The communications device uses the indication of the format of the symbols on the first band of frequencies and combines this with an indication of the format of symbols on a second band of frequencies configured for receiving downlink data to determine a use (for example to perform uplink transmission on the first band of frequencies 801 or perform downlink reception on the second band of frequencies) for the symbols. Accordingly, the skilled person will read references to "uplink", "downlink" or "flexible" symbols to mean indications of the symbols as "uplink", "downlink" or "flexible" in the SFI respectively.

Figure 9:
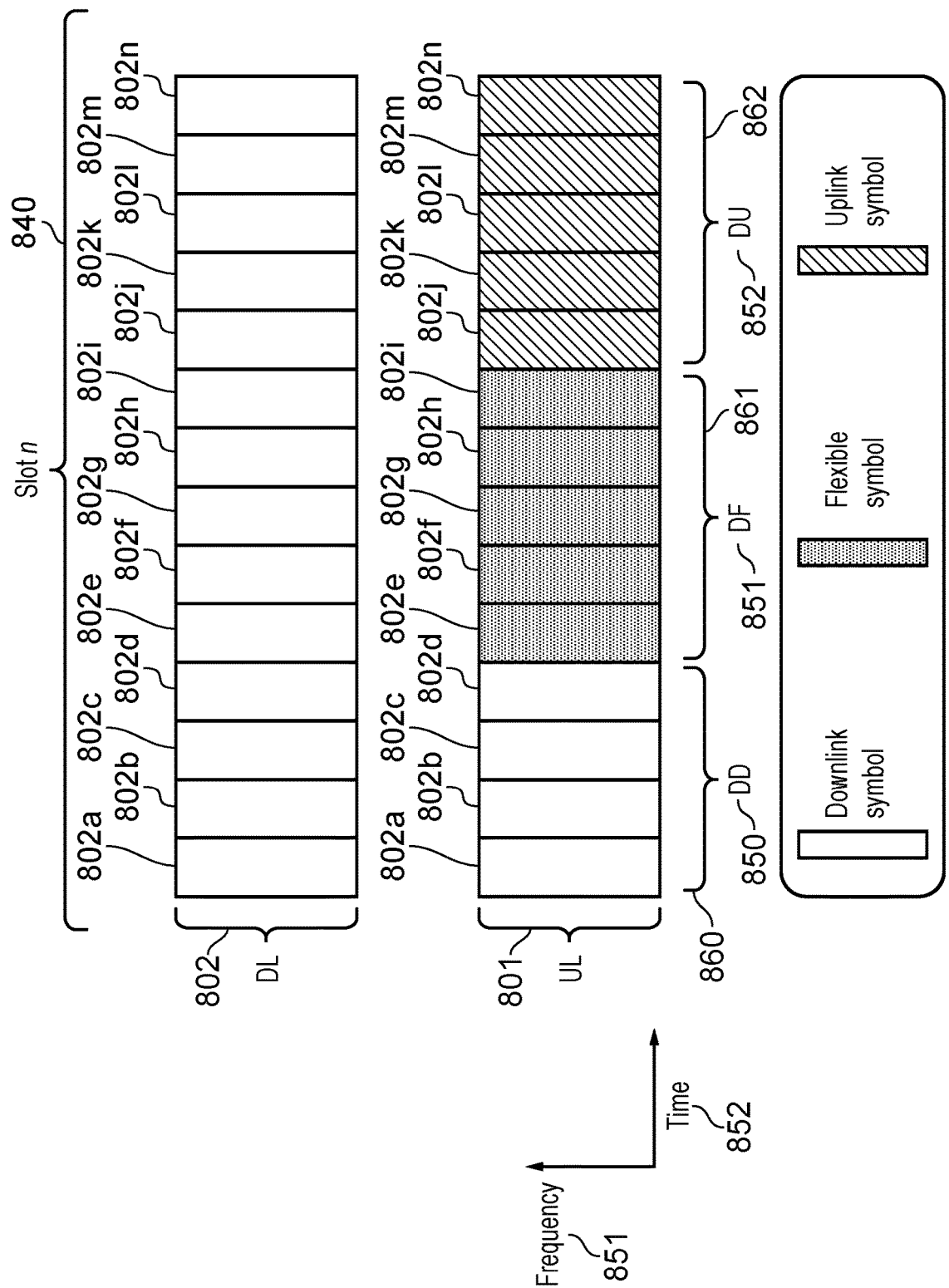
FIG. 9 is an illustrative example of a format of communication resources of a first band of frequencies configured for transmitting uplink data and a format of communication resources of a second band of frequencies configured for receiving downlink data over one time slot according to an example embodiment.

FIG. 9 shows a first band of frequencies 801 configured for transmitting data to the wireless communications network (i.e. uplink transmission) and a second band of frequencies 802 configured for receiving data from a wireless communications network (i.e. downlink reception) in a time slot n 840. The first band of frequencies 801 in this example has the same format as the band of frequencies 801 in FIG. 8.

The second band of frequencies 802 is also in the time slot n 840. The time slot n 840 is divided into 14 time units 802*a*-802*n* for the second band of frequencies 802. The time units may each correspond to an OFDM symbol for example. It will be appreciated that a different number of time units in a time slot of the band of frequencies can be configured.

In some embodiments, a separate SFI is used to indicate the format of the first band of frequencies 801 and the second band of frequencies 802. For example, a first SFI may indicate the format of the first band of frequencies via a first half of a Group-Common Downlink Control Information (GC-DCI) transmitted by Group-Common Physical Downlink Control Channel (GC-PDCCH) and a second SFI may indicate the format of the second band of frequencies via a second half of the GC-DCI. In other examples, a first SFI may indicate the format of the first band of frequencies via a first Group-Common Physical Downlink Control Channel (GC-PDCCH) and a second SFI may indicate the format of the second band of frequencies via a second GC-PDCCH. FIG. 9 shows that the symbols 802*a*-802*n* in the time slot n 840 of the second band of frequencies are all downlink symbols whereas the symbols 801*a*-801*n* in the time slot n 840 of the first band of frequencies 801 are not all downlink symbols. In the time slot n 840 of the first band of frequencies 801, four symbols 801*a* to 801*d* are indicated as downlink symbols, five symbols 801*e* to 801*i* are indicated as flexible symbols and five symbols 801*j* to 801*n* are indicated as uplink symbols.

A dual slot format indicator (dual SFI) may be defined on the basis of at least one symbol of the first band of frequencies and a corresponding symbol occurring at the same point of time in the second band of frequencies.

For example, FIG. 9 illustrates that four indicated downlink symbols of the first band of frequencies 801*a*-801*d* overlap in time 860 with four indicated downlink symbols of the second band of frequencies 802*a*-801*d*. The dual slot format indicator for the overlap time 860 may be labelled resource-DD 850. FIG. 9 also illustrates that five indicated flexible symbols of the first band of frequencies 801*e*-801*i* overlap in time 861 with five indicated downlink symbols of the second band of frequencies 802*e*-801*i*. The dual slot format indicator for the overlap time 861 may be labelled resource-DF 851. FIG. 9 also illustrates that five indicated uplink symbols of the first band of frequencies 801*j*-801*n* overlap in time 862 with five other indicated downlink symbols of the second band of frequencies 802*j*-801*n*. The dual slot format indicator for the overlap time 862 may be labelled resource-DU 852.

Figure 10:
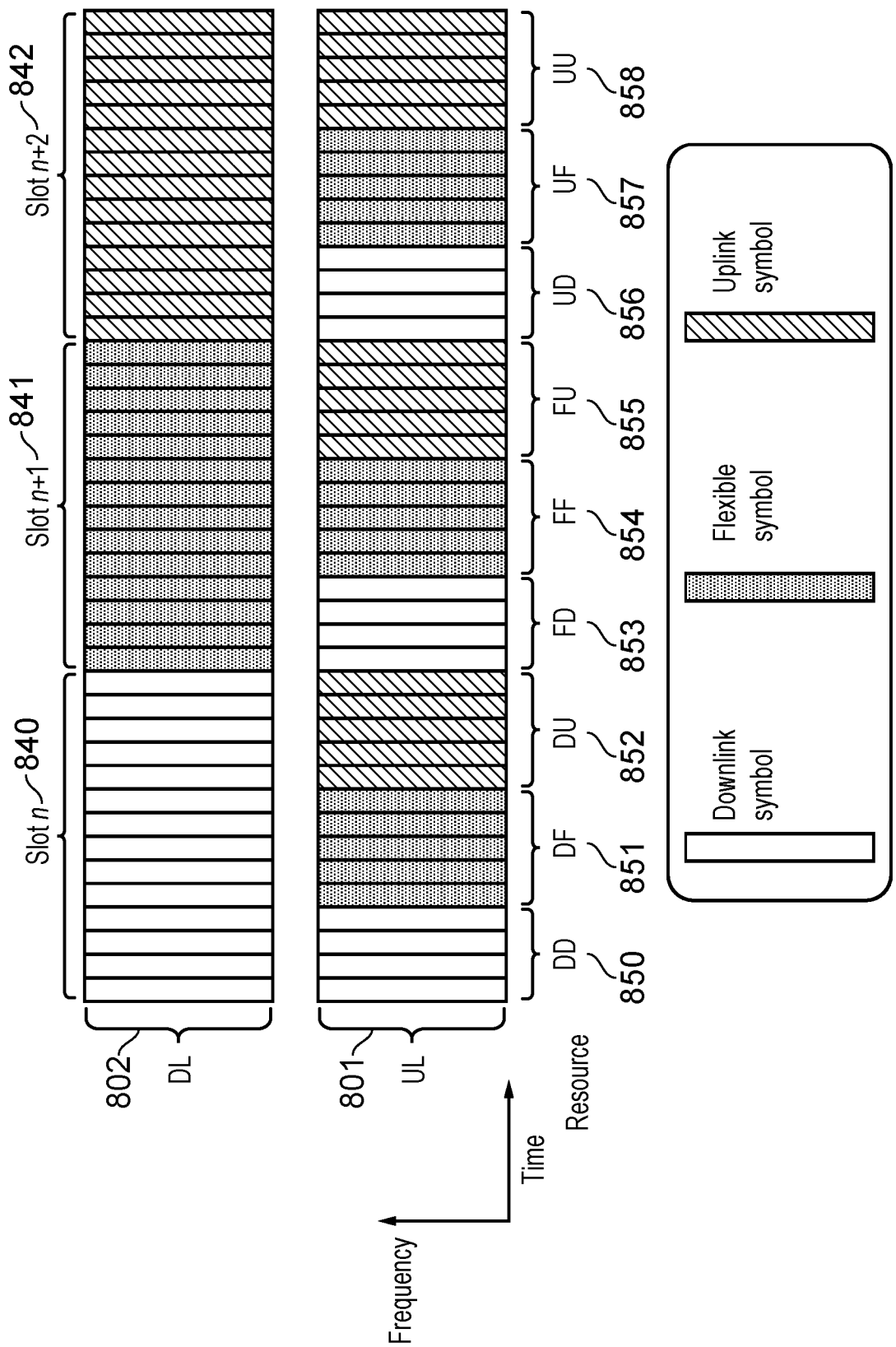
FIG. 10 is an illustrative example of a format of communication resources of a first band of frequencies configured for transmitting uplink data and a format of communication resources of a second band of frequencies configured for receiving downlink data over three time slots according to an example embodiment.

FIG. 10 shows a first band of frequencies 801 configured for transmitting data to a wireless communications network and a second band of frequencies 802 configured for receiving data from the wireless communications network over three time slots 840-842. The reference numerals for the individual symbols have been omitted in this illustration for clarity. The dual-SFI for the overlap of indicated downlink symbols on the first band of frequencies 801 with indicated flexible symbols on the second band of frequencies 802 may be labelled resource-FD 853. The dual-SFI for the overlap of indicated flexible symbols on the first band of frequencies 801 with indicated flexible symbols on the second band of frequencies 802 may be labelled resource-FF 854. The dual-SFI for the overlap of indicated uplink symbols on the first band of frequencies 801 with indicated flexible symbols on the second band of frequencies 802 may be labelled resource-FU 855. The dual-SFI for the overlap of indicated downlink symbols on the first band of frequencies 801 with indicated uplink symbols on the second band of frequencies 802 may be labelled resource-UD 856. The dual-SFI for the overlap of indicated flexible symbols on the first band of frequencies 801 with indicated uplink symbols on the second band of frequencies 802 may be labelled resource-UF 857. The dual-SFI for the overlap of indicated uplink symbols on the first band of frequencies 801 with indicated uplink symbols on the second band of frequencies 802 may be labelled resource-UU 858.

Table 1 shows the labelling of nine possible dual-SFIs based on the format of symbols in the first and second band of frequencies in the present embodiment.

TABLE 1

|  |  | SFI in second band of frequencies | | |
|---|---|---|---|---|
|  |  | 'D (downlink)' | 'U (uplink)' | 'F (Flexible)' |
| SFI in first band of frequencies | 'D (downlink)' | Resource-DD | Resource-UD | Resource-FD |
|  | 'U (uplink)' | Resource-DU | Resource-UU | Resource-FU |
|  | 'F (Flexible)' | Resource-DF | Resource-UF | Resource-FF |

As will be explained below, the communications device may use the dual SFI to determine whether to transmit or receive data on the communication resources associated with the dual SFI in the case where the first communication resources and second communication resources overlap in time.

The communications device may receive from the wireless communications network a first allocation (such as DCI #1 720) of first communication resources for transmitting data to the wireless communications network, and a second allocation (DCI #2 721) of second communication resources for receiving data from the wireless communications network. The communications device may also receive a format (a slot format) of the first communication resources (indicated by a first SFI, for example) and a format of the second communication resources (indicated by a second SFI, for example). The communications device may then determine whether the first communication resources and the second communications overlap in time (for example, in FIG. 7, the first communications resources 723 overlap in time with the second communications resources 722). The communications device may the select on a basis of the format of the first communication resources and the format of the second communication resources, to either transmit data to the wireless communications network on the first communication resources or to receive data from the wireless communications network on the second communication resources; and either refrain from receiving data on the second communication resources if the communications device selects to transmit data on the first communication resources; or refrain from transmitting data on the first communication resources if the communications device selects to receive data on the second communication resources.

In some embodiments, the format of the first communication resources is indicated by a first SFI and the format of the second communication resources is indicated by a second SFI. In this embodiment, the combination of the format of symbols used for the first communications resources and the format of symbols used for the second communication resources is labelled by a dual SFI.

Figure 11:
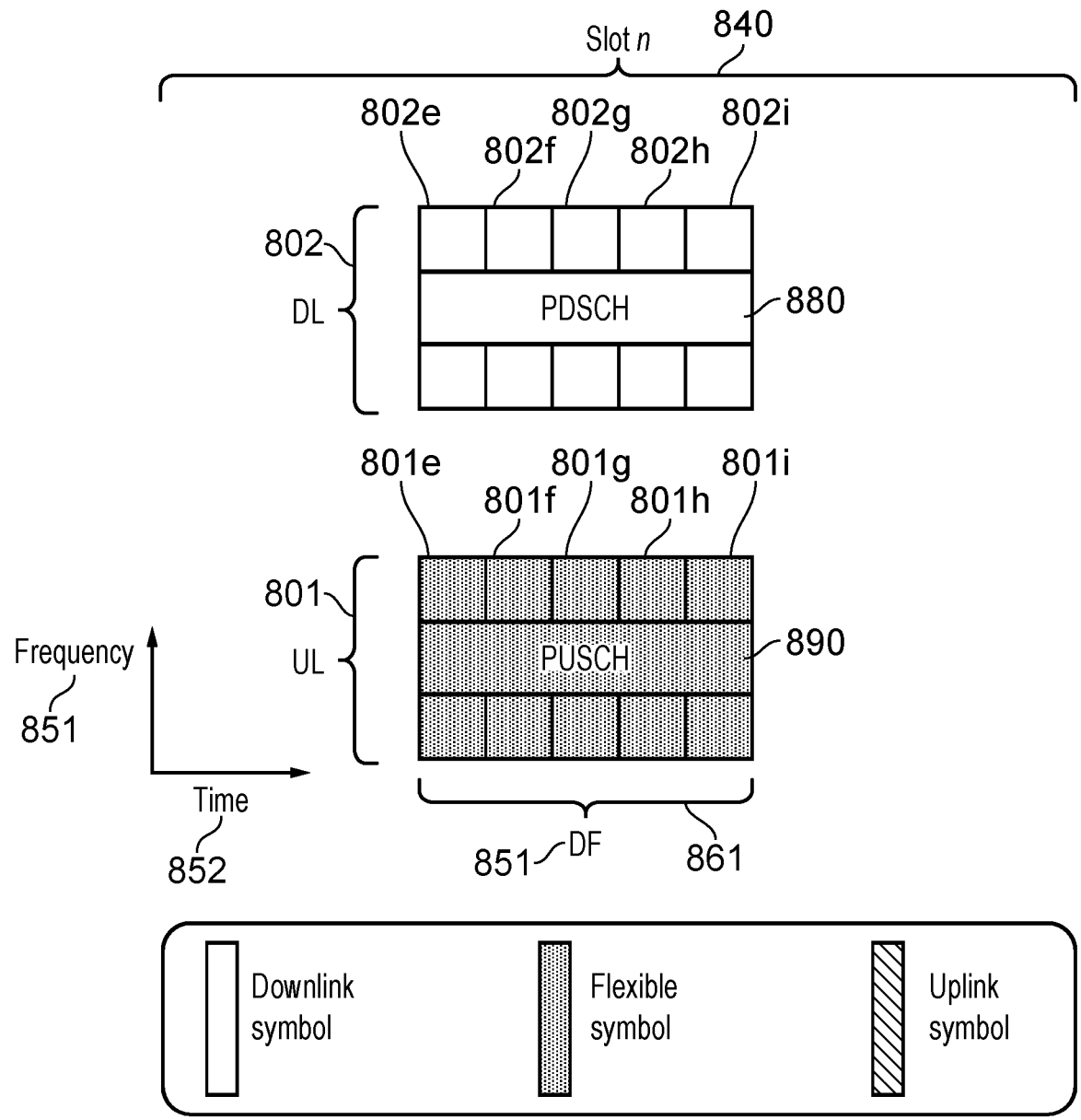
FIG. 11 is an illustrative example of first communications resources and second communication resources completely overlapping in time according to an example embodiment.

In some embodiments the communications device may determine that the first communication resources and the second communication resources overlap in time. FIG. 11 is based on FIG. 8 and the same reference numerals have been applied. As an example of this embodiment, FIG. 11 indicates that the PUSCH transmission 890 (uplink transmission) scheduled on symbols that had been indicated as flexible symbols 801*e*-801*i* in the SFI of the first band of frequencies 801 overlaps in time 861 with the PDSCH reception 880 (downlink reception) scheduled on the five symbols that had been indicated as downlink symbols in the SFI 802*e*-802*i* of the second band of frequencies 802. Therefore there is a collision between the uplink transmission and the downlink reception. In other words, the communications device determines that the first communication resources and the second communication resources overlap in time. The format of the flexible symbols 801*e*-801*i* of the first band of frequencies 801 and the format of the downlink symbols 802*e*-802*i* of the second band of frequencies 802 may be labelled as resource-DF 851 according to Table 1. The communications device determines, based on the format of symbols used for the first communication resources and the format of symbols used for the second communication resources, whether to transmit the scheduled uplink transmission on symbols indicated as flexible symbols in the SFI 801*e*-801*i* of the first band of frequencies 801 or to receive the scheduled downlink reception on symbols indicated as downlink symbols in the SFI 802*e*-802*i* of the second band of frequencies 802. In the example, since the dual SFI indicates resource-DF for the overlapping resources, the communications device may prioritise downlink reception according to prioritisation rules that are defined in Table 2. In other words, the communications device determines, on the basis of resource-DF, to receive the scheduled downlink reception on downlink symbols 802*e*-802*i* of the second band of frequencies 802. The communications device refrains from transmitting the scheduled uplink transmission on the symbols indicated as flexible symbols in the SFI 801*e*-801*i* of the first band of frequencies 801. The communications device may determine whether to cancel or postpone the scheduled uplink transmission on the flexible symbols 801*e*-801*i* of the first band of frequencies 801.

In a similar way, if it is determined that the dual SFI indicates resource-FU 855 for the overlapping resources, the communications device may prioritise uplink transmission on the corresponding symbols indicated as uplink symbols in the SFI of the first band of frequencies and refrain from receiving data on the corresponding symbols indicated as flexible symbols in the SFI of the second band of frequencies. The communications device may determine whether to cancel or postpone the scheduled downlink reception on the symbols indicated as flexible symbols in the SFI of the second band of frequencies 802.

In some embodiments, the communications device cancels or postpones an uplink transmission scheduled on either a resource-DD or resource-FD, regardless of whether there is a collision between the scheduled uplink transmission and a scheduled downlink transmission.

In some embodiments, the communications device cancels or postpones an uplink transmission scheduled on either a resource-UU or resource-UF, regardless of whether there is a collision between the scheduled uplink transmission and a scheduled downlink transmission.

In some embodiments, the communications device may cancel or postpone both an uplink transmission and downlink reception scheduled on a resource-UD.

In some embodiments, if there is a collision between an uplink transmission and downlink transmission on a resource-DU or FF, the communications device may determine whether to transmit the uplink data or receive the downlink data on a basis of a type of allocation signalling and a timing of the allocation signalling. For example, if both downlink reception is scheduled by DCI #1 and uplink transmission is scheduled by DCI #2, priority is given to the uplink transmission if DCI #2 arrives at the communications device at a later time than DCI #1 and vice versa. In an alternative example, if uplink transmission is scheduled by DCI (i.e. the uplink transmission is of type "scheduled by DCI") and downlink transmission is scheduled by Radio Resource Control (RRC) Signalling (i.e. the downlink transmission is of type "scheduled by RRC"), uplink transmission is prioritised and vice versa. In other examples, the priority may depend on the type of channel (e.g. PDCCH, PUCCH, PDSCH, PUSCH, PRACH, PBCH) and signal (CSI-RS, PSS, SSS, SRS). For example, PBCH may be given the highest priority and PUCCH may be given a higher priority than PDCCH.

Table 2 is an example of how a communications device determines whether uplink transmission or downlink reception has priority based on a dual-SFI (in other words, based on the format of symbols used for the first communication resources and the format of symbols used for the second communication resources) when there is a scheduled collision between the uplink transmission and the downlink reception. It will be appreciated that the priority rules indicated herein are only examples. For example, the resource UD may not allow uplink transmission or downlink reception in an alternative example.

TABLE 2

|  |  | SFI on Downlink spectrum | | |
| --- | --- | --- | --- | --- |
|  |  | 'D (downlink)' | 'U (uplink)' | 'F (Flexible)' |
| SFI on Uplink spectrum | 'D (downlink)' | Only DL data | No UL or DL data | Only DL data |
|  | 'U (uplink)' | Depending on signalling | Only UL data | UL data is prioritised |
|  | 'F (Flexible)' | DL data is prioritised | Only UL data | Depending on signalling |

In other examples, on resource-UD, the communications device follows a prioritisation rule indicated in DCI or RRC. In other examples, on resource-UD, the communications device cancels both the uplink transmission and the downlink reception.

In other examples, when 'D' is indicated in the second band of frequencies for a communications device (i.e. Resource-DD, DU or DF), the communications device may only perform downlink reception on the resource. Accordingly, on Resource-DD, DU or DF, if uplink transmission is scheduled, the uplink transmission is cancelled or postponed.

In other examples, when 'U' is indicated in the first band of frequencies for a communications device (i.e. Resource-UU, DU or DU), the communications device may only perform uplink transmission on the resource. Accordingly, on Resource-UU, DU and FU, if downlink transmission is scheduled, the downlink transmission is cancelled or postponed.

In other examples, when 'F' is indicated in the first or second band of frequencies for a communications device (i.e. Resource-DF, FD, UF, FU, or FF), the communications device determines downlink reception or uplink transmission based on DCI and/or RRC signalling.

In other examples, when 'D' is indicated in the first band of frequencies for a communications device (i.e. Resource-DD, UD and FD), the communications device cancels or postpones any uplink transmissions including pre-configured uplink data.

In other examples, when 'U' is indicated in the second band of frequencies for a communications device (i.e. Resource-UD, UU and UF), the communications device cancels or postpones any downlink receptions including pre-configured downlink data.

In other examples, 'U' is not indicated in the second band of frequencies and 'D' is not indicated in first band of frequencies. In other words, only either 'D' or 'F' is indicated in the second band of frequencies, and only either 'U' or 'F' is indicated in the first band of frequencies. If a communications device receives an SFI with 'U' in the second band of frequencies or 'D' in the first band of frequencies, the communications device assumes the received SFI is in error.

In other examples, the communications device does not receive an indication of the format of the first band of frequencies and/or the format of the second band of frequencies. According to some examples, the communications device does not receive an SFI. This may occur, for example, if a gNB did not transmit an SFI or if the communications device cannot successfully receive the SFI. In this example, the communications device may prioritise downlink reception over uplink transmission. That is, if uplink transmission and downlink reception are scheduled on the same resource then the communications device cancels or postpones the scheduled uplink transmission.

In other examples, the communications device may receive, by an RRC signal from the wireless communications network, a pre-configured format of the first band of frequencies and/or a pre-configured format of the second band of frequencies. These pre-configured formats may be the same for all communications devices in the same cell (i.e. cell-specific formats) or may be unique to each communications device in a cell (i.e. communication device-specific formats). Hence in some examples, the RRC signalling indicates a pre-configured format for one of the bands of frequencies and dynamic SFI signalling indicates a format for the other band of frequencies.

UE Behaviour for Cancelled or Postponed Data

In some embodiments, if it is determined that the first communication resources and the second communication resources overlap in time and the communications device selects whether to transmit data on the first communication resources or receive data on the second communication resources, the communications device determines whether to cancel or postpone the transmission (if the reception is selected) or whether to cancel or postpone the reception (if the transmission is selected).

In some embodiments, the determining whether to cancel or postpone the transmission or the reception may be defined by a specification for a system so that the determination is predetermined.

In some embodiments, the determining whether to cancel or postpone the transmission or the reception may be indicated by a Radio Resource Control (RRC) signal received by the communications device from the wireless communications network.

In some embodiments, the RRC signal or the specification indicates to the communications device that, if a transmission on the first communication resources has been selected, to cancel reception of data on the second communication resources.

In some embodiments, the RRC signal or the specification indicates to the communications device that, if a reception on the second communication resources has been selected, to cancel transmission of data on the second communication resources.

In some embodiments, the cancelling or the postponing of the transmission or the reception may apply to only part of the transmission or the reception respectively. For example, if the first communication resources and the second communication resources overlap only partly in time, and the communications device selects that it should transmit data on the first communication resources, then the communications device may only cancel or postpone the part of the second communication resources which overlapped with the first communication resources.

Figure 12:
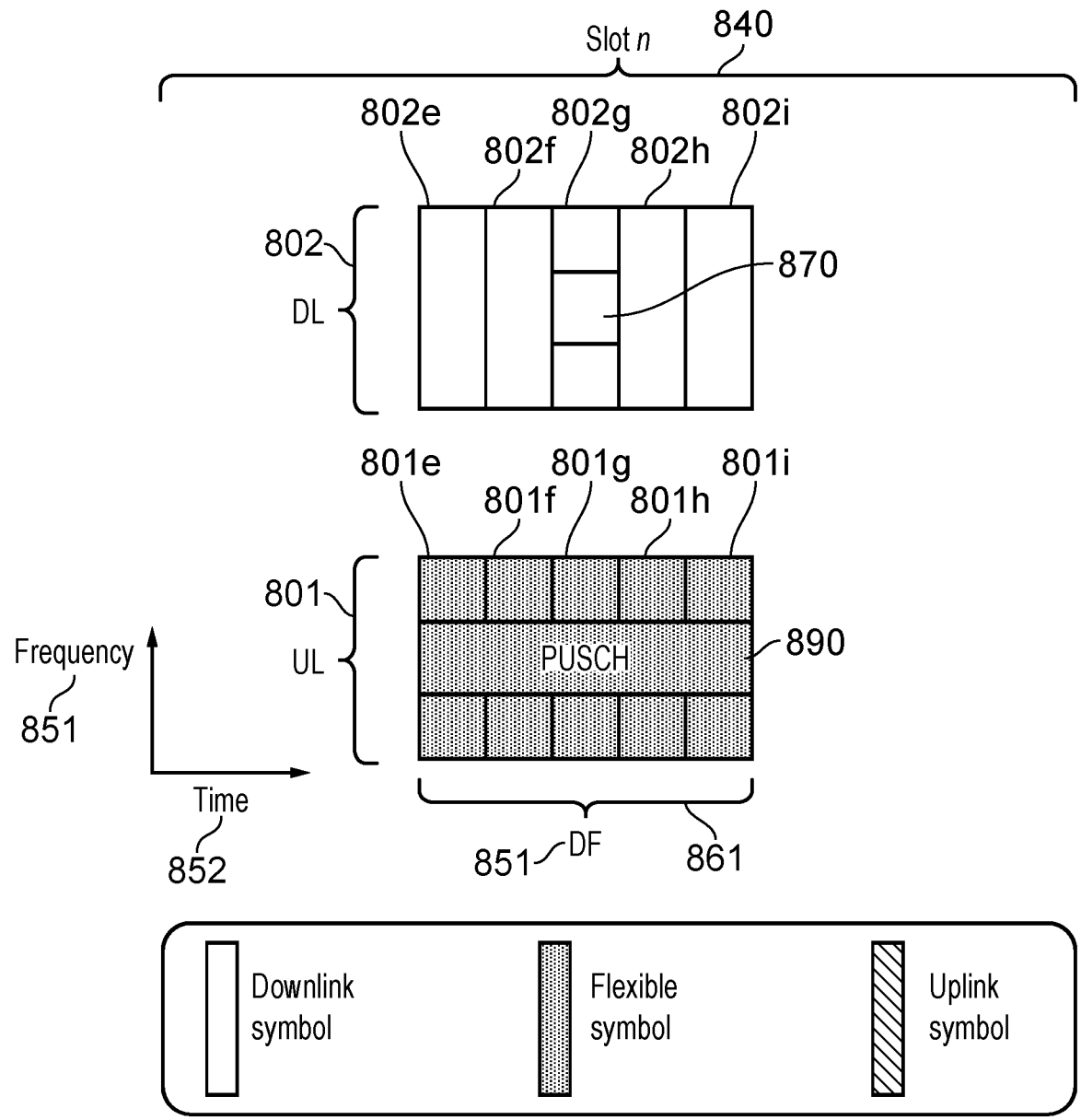
FIG. 12 is an illustrative example of first communication resources and second communication resources partly overlapping in time according to an example embodiment.

FIG. 12 is based on FIG. 11 and the same reference numerals have been applied. FIG. 12 indicates that a scheduled PUSCH transmission 890 (uplink transmission) on the five flexible symbols 801e-801i of the first band of frequencies 801 overlap in time 861 with a scheduled PDSCH transmission (downlink reception) 870 on a downlink symbol 802g of the second band of frequencies 802. Therefore there is a collision between the uplink transmission and the downlink reception. The format of the flexible symbols 801e-801i of the first band of frequencies 801 and the format of the downlink symbols 802e-802i of the second band of frequencies 802 may be labelled as resource-DF according to Table 1. In this example, the first communication resources overlap with the second communication resources only partly. That is, the downlink symbol 802g on which the PDSCH is scheduled overlaps in time with one 801g of the flexible symbols 802e-802i on which the PUSCH is scheduled. According to Table 2, downlink reception is prioritised on resource-DF. The communications device therefore determines to receive the downlink reception on the downlink symbol 802g on which the PDSCH is scheduled. In one embodiment, the communications device determines to cancel or postpone only the symbol 801g on which the PUSCH was scheduled. In this embodiment, the PUSCH transmission scheduled on non-overlapping symbols 801e, 801f, 801h, 801i may be allowed to proceed. In other embodiments, only the PUSCH transmission scheduled on non-overlapping symbols which occur before the collision 801e, 801f may be allowed to proceed. In this embodiment, the communications device determines to postpone or cancel the PUSCH transmission scheduled on the symbols 801g-801i which occur during and after the collision.

In some embodiments, the format of the first band of frequencies and the second band of frequencies can be used to determine, if a transmission/reception is to be cancelled or postponed, whether to only cancel or postpone the scheduled transmission/reception on symbols which overlap or whether to cancel or postpone the entire scheduled transmission/reception from the time at which overlap occurs until the end of the transmission/reception.

As illustrative examples,

Resource-DF may indicate that uplink transmission is cancelled or postponed for the overlapping symbol only.

Resource-FD may indicate that uplink transmission is cancelled or postponed for the overlapping symbol and the rest of the transmission.

In other embodiments, some dual-SFI combinations can be associated with "cancellation functionality" and other dual-SFI combinations can be associated with "postponement functionality". For example:

Resource-DF may indicate that uplink transmission is cancelled.

Resource-FD may indicate that uplink transmission is postponed

The above two embodiments can be combined, for example, such that some dual-SFI combinations indicate that single overlapping symbols are cancelled while other combinations indicate that the rest of the transmission is postponed. For example:

Resource-DF may indicate that the single overlapping symbol is cancelled in the uplink transmission.

Resource-FD may indicate that the overlapping symbol and the rest of the uplink transmission is postponed.

It will be appreciated that the phrase "communication resources" used herein may alternatively be referred to as "physical resources".

As will be appreciated from the above explanation, embodiments of the present disclosure can resolve a conflict between allocations of the uplink channel and the downlink channel which overlap in time, wherein the resolving the conflict is by combining the first and second format indicators, which may be slot format indicators (SFI) to form dual-SFIs. Although SFI are known for signalling a format for applying the physical resources of a time slot in a TDD system, the SFI has been redeployed to indicate how a collision or conflict should be resolved when this occurs as a result of conflicting service level requirements in an HD-FDD system.

Summary of Operation

Figure 13:
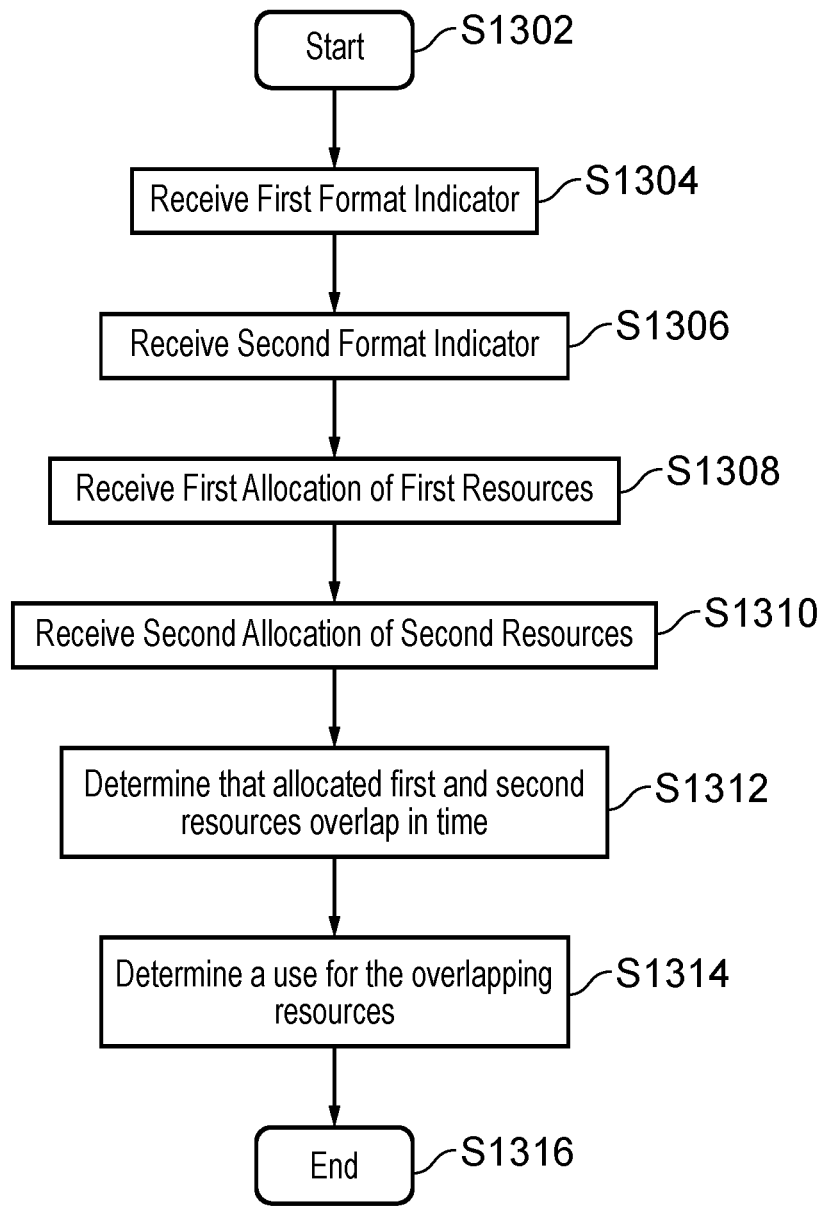
FIG. 13 is a flow diagram providing an example illustration of an operation of a communications device according to an example embodiment.

A flow diagram summarising an operation of a communications device according to an example embodiment is shown in FIG. 13. FIG. 13 is summarised as follows:

After the start S1302 of the operation, a UE receives a first format indicator for an uplink channel of a wireless access interface provided by the wireless communications network S1304. The first format indicator may be a first SFI. The first SFI may have been transmitted to the UE from an infrastructure equipment forming part of the wireless communications network by means of a GC-PDCCH. The format indicated by the first SFI may have been an indication of whether each OFDM symbol of the uplink channel is indicated as "uplink", "downlink" or "flexible".

Next, the UE receives a second format indicator for a downlink channel of a wireless access interface provided by the wireless communications network S1306. The second format indicator may be a second SFI. The second SFI may have been transmitted to the UE from an infrastructure equipment forming part of the wireless communications network by means of a GC-PDCCH. The format indicated by the second SFI may have been an indication of whether each OFDM symbol of the downlink channel is indicated as "uplink", "downlink" or "flexible".

Next, the UE receives a first allocation of first physical resources S1308 of an uplink channel. The first allocation may be a first DCI. The first DCI may include an indication as to the frequency and time range over which an uplink transmission is scheduled on the uplink channel.

Next, the UE receives a second allocation of second physical resources S1310 of a downlink channel. The second allocation may be a second DCI. The second DCI may include an indication as to the frequency and time range over which an downlink reception is scheduled on the downlink channel.

Next, the UE determines that one or more of the first physical resources of the uplink channel and one or more of the second physical resources of the downlink channel overlap in time S1312. The UE may determine that one or more OFDM symbols of the first physical resources on which an uplink transmission has been scheduled overlap in time with one or more OFDM symbols of the second physical resources on which a downlink reception has been scheduled.

Next, the UE determines, on a basis of the first format indicator for the uplink channel and the second format indicator for the downlink channel, a use of each of the one or more first physical resources and the one or more second physical resources which overlap in time S1314. The UE may determine the use of the overlapping first and second physical resources based on a combination of the format of the first physical resources and the second physical resources indicated by the first format indicator and the second format indicator respectively. If the first format indicator is a first SFI and the second format indicator is a second SFI, then the UE may combine the formats indicated by the first and second SFI to form a dual SFI. The UE may then determine the use of the overlapping physical resources on the basis of the dual SFI. The UE may determine that the overlapping first physical resources should be used for a scheduled uplink transmission and that UE should refrain from a scheduled downlink reception on the overlapping second physical resources or vice versa. The UE may determine whether to cancel or to postpone the scheduled uplink transmission/downlink reception which the UE refrains from using. After the UE has determined a use for the overlapping physical resources, the operation ends S1316.

It will be appreciated that while the present disclosure has in some respects focused on implementations in an LTE-based and/or 5G network for the sake of providing specific examples, the same principles can be applied to other wireless telecommunications systems. Thus, even though the terminology used herein is generally the same or similar to that of the LTE and 5G standards, the teachings are not limited to the present versions of LTE and 5G and could apply equally to any appropriate arrangement not based on LTE or 5G and/or compliant with any other future version of an LTE, 5G or other standard.

It may be noted various example approaches discussed herein may rely on information which is predetermined/predefined in the sense of being known by both the base station and the communications device. It will be appreciated such predetermined/predefined information may in general be established, for example, by definition in an operating standard for the wireless telecommunication system, or in previously exchanged signalling between the base station and communications devices, for example in system information signalling, or in association with radio resource control setup signalling, or in information stored in a SIM application. That is to say, the specific manner in which the relevant predefined information is established and shared between the various elements of the wireless telecommunications system is not of primary significance to the principles of operation described herein. It may further be noted various example approaches discussed herein rely on information which is exchanged/communicated between various elements of the wireless telecommunications system and it will be appreciated such communications may in general be made in accordance with conventional techniques, for example in terms of specific signalling protocols and the type of communication channel used, unless the context demands otherwise. That is to say, the specific manner in which the relevant information is exchanged between the various elements of the wireless telecommunications system is not of primary significance to the principles of operation described herein.

It will be appreciated that the principles described herein are not applicable only to certain types of communications device, but can be applied more generally in respect of any types of communications device, for example the approaches are not limited to URLLC/IIoT devices or other low latency communications devices, but can be applied more generally, for example in respect of any type of communications device operating with a wireless link to the communication network.

It will further be appreciated that the principles described herein are applicable not only to LTE-based or 5G/NR-based wireless telecommunications systems, but are applicable for any type of wireless telecommunications system that supports a dynamic scheduling of shared communication resources.

Further particular and preferred aspects of the present invention are set out in the accompanying independent and dependent claims. It will be appreciated that features of the dependent claims may be combined with features of the independent claims in combinations other than those explicitly set out in the claims.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology such that no inventive subject matter is dedicated to the public.

Respective features of the present disclosure are defined by the following numbered paragraphs:

Paragraph 1. A method of transmitting and/or receiving data by a communications device operating according to a Half Duplex Frequency Division Duplex mode of operation (HD-FDD) in a wireless communications network, the method comprising
receiving a first format indicator for an uplink channel of a wireless access interface provided by the wireless communications network for transmitting uplink data to the wireless communications network,
receiving a second format indicator for a downlink channel of the wireless access interface provided by the wireless communications network for receiving downlink data from the wireless communications network,
receiving, by the communications device, from the wireless communications network a first allocation of first physical resources allocated from physical resources of the uplink channel for transmitting uplink data to the wireless communications network;
receiving from the wireless communications network a second allocation of second physical resources allocated from physical resources of the downlink channel for receiving downlink data from the wireless communications network;
determining that one or more of the first physical resources of the uplink channel and one or more of the second physical resources of the downlink channel overlap in time;
determining, on a basis of the first format indicator for the uplink channel and the second format indicator for the downlink channel, a use of each of the one or more first physical resources and the one or more second physical resources which overlap in time,
wherein the first format indicator defines a format for each of the physical resources of the uplink channel, and the second format indicator defines a format for each of the physical resources of the downlink channel.

Paragraph 2. A method according to paragraph 1, wherein the determining on the basis of the first format indicator for the uplink channel and the second format indicator for the downlink channel the use of each of the one or more first physical resources and the one or more second physical resources which overlap comprises,
combining for each of the one or more first physical resources of the uplink channel and the one or more second physical resources of the downlink channel which overlap in time, the defined format from the first format indicator and the second format indicator, and
determining the use of each of the one or more first physical resources and the one or more second physical resources which overlap in time based on the combined first and second format indicators according to a predetermined rule.

Paragraph 3. A method according to paragraph 1 or 2, wherein the physical resources of the uplink channel are divided into a plurality of time slots, each time slot including a plurality of the physical resources of the uplink channel, and the physical resources of the downlink channel are divided into a plurality of time slots, each time slot including a plurality of the physical resources of the downlink channel, and the first format indicator identifies the format for each of the physical resources of the uplink channel by identifying for each of the plurality of the physical resources of each time slot of the uplink channel a defined application of each of the plurality of the physical resources of the uplink channel, and the second format indicator identifies the format for the physical resources of the downlink channel by identifying for each of the plurality of the physical resources of each time slot of the downlink channel a defined application of each of the plurality of the physical resources of the downlink channel.

Paragraph 4. A method according to paragraph 3, wherein the defined application of each of the plurality of the physical resources of the first format indicator and the second format indicator comprises one of set of possible applications of the physical resource.

Paragraph 5. A method according to paragraph 4, wherein the set of possible applications comprises use of the physical resource for uplink transmission, U, use of the physical resource for downlink transmission, D, and flexible use of the physical resource for either uplink or downlink transmission, F.

Paragraph 6. A method according to any of paragraphs 1 to 5, wherein the physical resources of the uplink channel and the physical resources of the downlink channel comprise Orthogonal Frequency Division Multiplexed, OFDM, symbols, the first format indicator defining the format for each of the OFDM symbols of the uplink channel, and the second format indicator defining the format for each of the OFDM symbols of the downlink channel.

Paragraph 7. A method according to paragraph 6, wherein the combining the defined format from the first format indicator and the second format indicator, for each of the one or more first OFDM symbols of the uplink channel and the one or more second OFDM symbols of the downlink channel which overlap in time, comprises
combining the defined application for the one or more first OFDM symbols of the uplink channel with the defined application for the corresponding overlapping one or more second OFDM symbols of the downlink channel.

Paragraph 8. A method according to paragraph 7, wherein the determining the use of each of the one or more first OFDM symbols and the one or more second OFDM symbols which overlap based on the combined first and second format indicators according to a predetermined rule comprises
using the combined defined application for the one or more first OFDM symbols of the uplink channel with the defined application for the corresponding overlapping one or more second OFDM symbols of the downlink channel to identify a predetermined use of the one or more first OFDM symbols of the uplink channel and the corresponding overlapping one or more second OFDM symbols of the downlink channel according to a predetermined rule.

Paragraph 9. A method of paragraph 8, wherein the using the combined defined application for the one or more first OFDM symbols of the uplink channel with the defined application for the corresponding overlapping one or more second OFDM symbols of the downlink channel comprises using the combined defined application to identify the predetermined use in a look-up table.

Paragraph 10. A method according to any of paragraphs 7 to 9, wherein the one or more of the first physical resources and the one or more second physical resources overlap in time if at least one of the plurality of OFDM symbols of the first physical resources overlaps in time with at least one of the plurality of OFDM symbols of the second physical resources.

Paragraph 11. A method according to any of paragraphs 1 to 5, wherein the determining the use of the one or more first physical resources and the one or more second physical resources which overlap comprises selecting either to transmit the uplink data to the wireless communications network on the one or more of the first physical resources of the uplink channel which overlap the one or more second physical resources of the downlink channel, or to receive the downlink data from the wireless communications network on the one or more of the second physical resources of the downlink channel which overlap the one or more of the first physical resources of the uplink channel.

Paragraph 12. A method according to any of paragraphs 1 to 5, wherein the determining the use of the one or more first physical resources and the one or more second physical resources which overlap in time comprises selecting either to refrain from receiving data on the one or more second physical resources of the downlink channel, if the communications device selects to transmit the uplink data on the one or more first physical resources of the uplink channel; or to refrain from transmitting the uplink data on the one or more first physical resources of the uplink channel, if the communications device selects to receive the downlink data on the one or more second physical resources of the downlink channel.

Paragraph 13. A method according to paragraph 12, wherein the refraining from receiving the downlink data on the one or more second physical resources of the downlink channel comprises selecting either to cancel or to postpone the reception of downlink data on the one or more second physical resources of the downlink which overlap in time with the one or more physical resources of the uplink channel.

Paragraph 14. A method according to paragraph 12 or 13, wherein the refraining from transmitting the uplink data on the one or more first physical resources of the uplink channel comprises selecting either to cancel or to postpone the transmission of the uplink data on the one or more first physical resources of the uplink channel.

Paragraph 15. A method according to paragraph 13, wherein the selecting either to cancel or to postpone the reception of the downlink data on the one or more second physical resources of the downlink channel is based on the defined format of each of the one or more physical resources of the first and second physical resources which overlap in time.

Paragraph 16. A method according to paragraph 14, wherein the selecting either to cancel or to postpone the transmission of the uplink data on the one or more first physical resources of the uplink channel is based on the defined format of each of the one or more physical resources of the one or more first and second physical resources which overlap in time.

Paragraph 17. A method according to paragraph 15, wherein the selecting either to cancel or to postpone the reception of the downlink data on the one or more second physical resources of the downlink channel is pre-specified.

Paragraph 18. A method according to paragraph 16, wherein the selecting either to cancel or to postpone the transmission of the uplink data on the one or more first physical resources of the uplink channel is pre-specified.

Paragraph 19. A method according to paragraph 15, wherein the selecting either to cancel or to postpone the reception of the downlink data on the one or more second physical resources of the downlink channel is based on a Radio Resource Control (RRC) signal received by the communications device from the wireless communications network.

Paragraph 20. A method according to paragraph 16, wherein the selecting either to cancel or to postpone the transmission of the uplink data on the one or more first physical resources of the uplink channel is based on RRC signalling received by the communications device from the wireless communications network.

Paragraph 21. A method according to any of paragraphs 11 to 20, comprising determining, on the basis of the format of the one or more of the first physical resources and the format of the one or more of the second physical resources, that the refraining from receiving the downlink data on the second physical resources of the downlink only applies to a portion of the second physical resources which overlaps in time with the first physical resources.

Paragraph 22. A method according to any of paragraphs 11 to 21, comprising determining, on the basis of the format of the one or more first physical resources and the format of the one or more second physical resources, that the refraining from transmitting data on the one or more first physical resources only applies to the portion of the one or more first physical resources which overlaps in time with the one or more second physical resources.

Paragraph 23. The method according to any of paragraphs 11 to 22, comprising determining, on the basis of the format of the one or more first physical resources and the format of the one or more second physical resources, that the refraining from receiving the one or more second physical resources applies to the portion of the one or more second physical resources which overlaps in time with the one or more first physical resources and a remaining portion of the one or more second physical resources indicated by the second allocation.

Paragraph 24. The method according to any of paragraphs 11 to 23, comprising determining, on the basis of the format of the one or more first physical resources and the format of the one or more second physical resources, that the refraining from transmitting the one or more first physical resources applies to the portion of the one or more first physical resources which overlaps in time with the one or more second physical resources and a remaining portion of the one or more first physical resources indicated by the first allocation.

Paragraph 25. A communications device for transmitting and/or receiving data operating according to a Half Duplex Frequency Division Duplex mode of operation (HD-FDD) in a wireless communications network, comprising receiver circuitry configured to receive signals from the wireless communications network transmitted via a downlink channel of a wireless access interface provided by the wireless communications network, transmitter circuitry configured to transmit signals to the wireless communications network via an uplink channel of the wireless access interface, and controller circuitry configured to control the receiver circuitry to receive a first format indicator for the uplink channel of the wireless access interface provided by the wireless communications network for transmitting uplink data to the wireless communications network, to receive a second format indicator for the downlink channel of the wireless access interface provided by the wireless communications network for receiving downlink data from the wireless communications network, to receive, by the communications device, from the wireless communications network a first allocation of first physical resources allocated from physical resources of the uplink channel for transmitting uplink data to the wireless communications network;

to receive from the wireless communications network a second allocation of second physical resources allocated from physical resources of the downlink channel for receiving downlink data from the wireless communications network; and the controller circuitry is configured to determine that one or more of the first physical resources of the uplink channel and one or more of the second physical resources of the downlink channel overlap in time;

to determine, on a basis of the first format indicator for the uplink channel and the second format indicator for the downlink channel, a use of each of the one or more first physical resources and the one or more second physical resources which overlap in time, wherein the first format indicator defines a format for each of the physical resources of the uplink channel, and the second format indicator defines a format for each of the physical resources of the downlink channel.

REFERENCES

[1] RP-182090, "Revised SID: Study on NR Industrial Internet of Things (IoT)," 3GPP RAN #81.

[2] 3GPP TR 38.913 "Study on scenarios and requirements for next generation access technologies"

[3] 3GPP document RP-193238, "New SID on support of reduced capability NR devices," Ericsson, RAN #86.

[4] Holma H. and Toskala A, "LTE for UMTS OFDMA and SC-FDMA based radio access", John Wiley and Sons, 2009.

What is claimed is:

1. A method of a communications device operating according to a Half Duplex Frequency Division Duplex mode of operation (HD-FDD) in a wireless communications network, the method comprising:

receiving a first format indicator for an uplink channel of a wireless access interface provided by the wireless communications network for transmitting uplink data to the wireless communications network on a first frequency band, receiving a second format indicator for a downlink channel of the wireless access interface provided by the wireless communications network for receiving downlink data from the wireless communications network on a second frequency band different from the first frequency band, receiving, by the communications device, from the wireless communications network a first allocation of first physical resources allocated from physical resources of the uplink channel for transmitting uplink data to the wireless communications network on the first frequency band;

receiving from the wireless communications network a second allocation of second physical resources allocated from physical resources of the downlink channel for receiving downlink data from the wireless communications network on the second frequency band different from the first frequency band;

determining that one or more of the first physical resources of the uplink channel on the first frequency band and one or more of the second physical resources of the downlink channel on the second frequency band different from the first frequency band overlap in time;

determining, on a basis of the first format indicator for the uplink channel on the first frequency band and the second format indicator for the downlink channel on the second frequency band different from the first frequency band, a use of each of the one or more first physical resources and the one or more second physical resources which overlap in time, wherein the first format indicator defines a format for each of the physical resources of the uplink channel on the first frequency band, and the second format indicator defines a format for each of the physical resources of the downlink channel on the second frequency band different from the first frequency band.

2. The method according to claim 1, wherein the determining on the basis of the first format indicator for the uplink channel on the first frequency band and the second format indicator for the downlink channel on the second frequency band different from the first frequency band the use of each of the one or more first physical resources and the one or more second physical resources which overlap comprises:

combining for each of the one or more first physical resources of the uplink channel on the first frequency band and the one or more second physical resources of the downlink channel on the second frequency band different from the first frequency band which overlap in time, the defined format from the first format indicator and the second format indicator, and determining the use of each of the one or more first physical resources and the one or more second physical resources which overlap in time based on the combined first and second format indicators according to a predetermined rule.

3. The method according to claim 1, wherein the physical resources of the uplink channel are divided into a plurality of time slots, each time slot including a plurality of the physical resources of the uplink channel, the physical resources of the downlink channel are divided into a plurality of time slots, each time slot including a plurality of the physical resources of the downlink channel, the first format indicator identifies the format for each of the physical resources of the uplink channel by identifying for each of the plurality of the physical resources of each time slot of the uplink channel a defined application of each of the plurality of the physical resources of the uplink channel, and the second format indicator identifies the format for the physical resources of the downlink channel by identifying for each of the plurality of the physical resources of each time slot of the downlink channel a defined application of each of the plurality of the physical resources of the downlink channel.

4. The method according to claim 3, wherein the defined application of each of the plurality of the physical resources of the first format indicator and the second format indicator comprises one of set of possible applications of the physical resource.

5. The method A method-according to claim 4, wherein the set of possible applications comprises use of the physical resource for uplink transmission, U, use of the physical resource for downlink transmission, D, and flexible use of the physical resource for either uplink or downlink transmission, F.

6. The method according to claim 2, wherein
the physical resources of the uplink channel and the physical resources of the downlink channel comprise Orthogonal Frequency Division Multiplexed, OFDM, symbols,
the first format indicator defines the format for each of the OFDM symbols of the uplink channel, and
the second format indicator defines the format for each of the OFDM symbols of the downlink channel.

7. The method according to claim 6, wherein the combining the defined format from the first format indicator and the second format indicator, for each of the one or more first OFDM symbols of the uplink channel on the first frequency band and the one or more second OFDM symbols of the downlink channel on the second frequency band different from the first frequency band which overlap in time, comprises:
combining the defined application for the one or more first OFDM symbols of the uplink channel with the defined application for the corresponding overlapping one or more second OFDM symbols of the downlink channel.

8. The method according to claim 7, wherein the determining the use of each of the one or more first OFDM symbols and the one or more second OFDM symbols which overlap based on the combined first and second format indicators according to the predetermined rule comprises:
using the combined defined application for the one or more first OFDM symbols of the uplink channel with the defined application for the corresponding overlapping one or more second OFDM symbols of the downlink channel to identify a predetermined use of the one or more first OFDM symbols of the uplink channel and the corresponding overlapping one or more second OFDM symbols of the downlink channel according to a predetermined rule.

9. The method according to claim 8, wherein the using the combined defined application for the one or more first OFDM symbols of the uplink channel with the defined application for the corresponding overlapping one or more second OFDM symbols of the downlink channel comprises:
using the combined defined application to identify the predetermined use in a look-up table.

10. The method according to claim 7, wherein the one or more of the first physical resources and the one or more second physical resources overlap in time if at least one of the plurality of OFDM symbols of the first physical resources overlaps in time with at least one of the plurality of OFDM symbols of the second physical resources.

11. The method according to claim 1, wherein the determining the use of the one or more first physical resources and the one or more second physical resources which overlap comprises selecting either;
determining to transmit the uplink data to the wireless communications network on the one or more of the first physical resources of the uplink channel on the first frequency band which overlap the one or more second physical resources of the downlink channel, or
determining to receive the downlink data from the wireless communications network on the one or more of the second physical resources of the downlink channel on the second frequency band different from the first frequency band which overlap the one or more of the first physical resources of the uplink channel.

12. The method according to claim 2, wherein the determining the use of the one or more first physical resources and the one or more second physical resources which overlap in time comprises selecting either:
determining to refrain from receiving data on the one or more second physical resources of the downlink channel, if the communications device selects to transmit the uplink data on the one or more first physical resources of the uplink channel, or
determining to refrain from transmitting the uplink data on the one or more first physical resources of the uplink channel, if the communications device selects to receive the downlink data on the one or more second physical resources of the downlink channel.

13. The method according to claim 12, wherein the refraining from receiving the downlink data on the one or more second physical resources of the downlink channel on the second frequency band different from the first frequency band comprises:
selecting either to cancel or to postpone the reception of downlink data on the one or more second physical resources of the downlink which overlap in time with the one or more physical resources of the uplink channel on the first frequency band.

14. The method according to claim 13, wherein the selecting either to cancel or to postpone the reception of the downlink data on the one or more second physical resources of the downlink channel on the second frequency band different from the first frequency band is based on the defined format of each of the one or more physical resources of the first and second physical resources which overlap in time.

15. The method according to claim 14, wherein the selecting either to cancel or to postpone the reception of the downlink data on the one or more second physical resources of the downlink channel on the second frequency band different from the first frequency band is defined by a specification.

16. The method according to claim 12, wherein the refraining from transmitting the uplink data on the one or more first physical resources of the uplink channel on the first frequency band comprises:
selecting either to cancel or to postpone the transmission of the uplink data on the one or more first physical resources of the uplink channel.

17. The method according to claim 16, wherein the selecting either to cancel or to postpone the transmission of the uplink data on the one or more first physical resources of the uplink channel on the first frequency band is based on the defined format of each of the one or more physical resources of the one or more first and second physical resources which overlap in time.

18. The method according to claim 17, wherein the selecting either to cancel or to postpone the transmission of the uplink data on the one or more first physical resources of the uplink channel on the first frequency band is defined by a specification.

19. A communications device operating according to a Half Duplex Frequency Division Duplex mode of operation (HD-FDD) in a wireless communications network, the communications device comprising:
receiver circuitry configured to receive signals from the wireless communications network transmitted via a downlink channel of a wireless access interface provided by the wireless communications network,
transmitter circuitry configured to transmit signals to the wireless communications network via an uplink channel of the wireless access interface, and
controller circuitry configured to control the receiver circuitry to receive a first format indicator for the uplink channel of the wireless access interface provided by the wireless communications network for transmitting uplink data to the wireless communications network on a first frequency band, to receive a second format indicator for the downlink channel of the wireless access interface provided by the wireless communications network for receiving downlink data from the wireless communications network on a second frequency band different from the first frequency band, to receive, by the communications device, from the wireless communications network a first allocation of first physical resources allocated from physical resources of the uplink channel for transmitting uplink data to the wireless communications network on the first frequency band, and to receive from the wireless communications network a second allocation of second physical resources allocated from physical resources of the downlink channel for receiving downlink data from the wireless communications network, wherein the controller circuitry is configured:

to determine that one or more of the first physical resources of the uplink channel on the first frequency band and one or more of the second physical resources of the downlink channel overlap in time; and to determine, on a basis of the first format indicator for the uplink channel on the first frequency band and the second format indicator for the downlink channel on the second frequency band different from the first frequency band, a use of each of the one or more first physical resources and the one or more second physical resources which overlap in time, the first format indicator defines a format for each of the physical resources of the uplink channel on the first frequency band, and the second format indicator defines a format for each of the physical resources of the downlink channel on the second frequency band different from the first frequency band.

20. Circuity for operating according to a Half Duplex Frequency Division Duplex mode of operation (HD-FDD) in a wireless communications network, the circuitry comprising:

receiver circuitry configured to receive signals from the wireless communications network transmitted via a downlink channel of a wireless access interface provided by the wireless communications network, transmitter circuitry configured to transmit signals to the wireless communications network via an uplink channel of the wireless access interface, and controller circuitry configured to control the receiver circuitry to receive a first format indicator for the uplink channel of the wireless access interface provided by the wireless communications network for transmitting uplink data to the wireless communications network on a first frequency band, to receive a second format indicator for the downlink channel of the wireless access interface provided by the wireless communications network for receiving downlink data from the wireless communications network on a second frequency band different from the first frequency band, to receive, by the communications device, from the wireless communications network a first allocation of first physical resources allocated from physical resources of the uplink channel for transmitting uplink data to the wireless communications network on the first frequency band, and to receive from the wireless communications network a second allocation of second physical resources allocated from physical resources of the downlink channel for receiving downlink data from the wireless communications network on the second frequency band different from the first frequency band; wherein the controller circuitry is configured:

to determine that one or more of the first physical resources of the uplink channel on the first frequency band and one or more of the second physical resources of the downlink channel on the second frequency band different from the first frequency band overlap in time; and to determine, on a basis of the first format indicator for the uplink channel on the first frequency band and the second format indicator for the downlink channel on the second frequency band different from the first frequency band, a use of each of the one or more first physical resources and the one or more second physical resources which overlap in time, the first format indicator defines a format for each of the physical resources of the uplink channel on the first frequency band, and the second format indicator defines a format for each of the physical resources of the downlink channel on the second frequency band different from the first frequency band.

* * * * *